US012712816B2

(12) United States Patent
Chen et al.

(10) Patent No.: US 12,712,816 B2
(45) Date of Patent: Aug. 18, 2026

(54) DELAY BUDGET DETERMINING METHOD AND APPARATUS

(71) Applicant: HUAWEI TECHNOLOGIES CO., LTD., Shenzhen (CN)

(72) Inventors: Weichao Chen, Shenzhen (CN); Shengyue Dou, Shanghai (CN); Shuri Liao, Shanghai (CN); Youlong Cao, Shanghai (CN); Erkai Chen, Kista (SE); Rui Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 330 days.

(21) Appl. No.: 18/624,413

(22) Filed: Apr. 2, 2024

(65) Prior Publication Data

US 2024/0283745 A1 Aug. 22, 2024

Related U.S. Application Data

(63) Continuation of application No. PCT/CN2022/115392, filed on Aug. 29, 2022.

(30) Foreign Application Priority Data

Oct. 9, 2021 (CN) .......................... 202111175530.6

(51) Int. Cl.
*H04W 28/02* (2009.01)
*H04L 43/0852* (2022.01)
(Continued)

(52) U.S. Cl.
CPC .............. *H04L 47/28* (2013.01); *H04L 65/80* (2013.01); *H04W 28/0268* (2013.01); *H04L 43/0852* (2013.01)

(58) Field of Classification Search
CPC ........... H04W 28/0268; H04L 43/0852; H04L 47/28; H04L 65/80
See application file for complete search history.

(56) References Cited

U.S. PATENT DOCUMENTS

2024/0121658 A1* 4/2024 Fu ........................... H04L 47/28
2024/0259871 A1* 8/2024 Wang ................ H04W 28/0278
2024/0380953 A1* 11/2024 Nemeth ............. H04N 21/6473

OTHER PUBLICATIONS

3GPP TS 23.501, "3rd Generation Partnership Project; Technical Specification Group Services and System Aspects; System Architecture for the 5G System (5GS); Stage 2 (Release 17)", 3GPP Organizational Partners, Sep. 2021, V17.2.0, 542 pages.

(Continued)

*Primary Examiner* — Kent Krueger
(74) *Attorney, Agent, or Firm* — Maier & Maier, PLLC

(57) ABSTRACT

A delay budget determining method and apparatus are provided. A communication device first determines a transmission delay of a first data packet from a server to a communication device, and then determines a delay budget of the first data packet from the communication device to a terminal device based on the transmission delay and an end-to-end packet delay budget. The delay budget of the first data packet from the communication device to the terminal device is determined based on the transmission delay of the first data packet from the server to the communication device. Therefore, even for an end-to-end delay-sensitive service, a transmission delay of a data packet of the end-to-end delay-sensitive service can also be ensured.

20 Claims, 10 Drawing Sheets

(51) Int. Cl.
*H04L 47/28* (2022.01)
*H04L 65/80* (2022.01)

(56) References Cited

OTHER PUBLICATIONS

3GPP TS 29.281, "3rd Generation Partnership Project; Technical Specification Group Core Network and Terminals; General Packet Radio System (GPRS) Tunnelling Protocol User Plane (GTPv1-U) (Release 17)", 3GPP Organizational Partners, Sep. 2021, V17.1.0, 34 pages.
Huawei et al., "Traffic Model for XR and Cloud Gaming", 3GPP TSG RAN WG1 Meeting #106-e, R1-2106456, XP052037784, Aug. 16-27, 2021, 8 pages.
Zhang et al., "Rendering Multi-Party Mobile Augmented Reality from Edge", The 29th ACM Workshop on Network and Operating, Association for Computing Machinery, ISBN 978-1-4503-6298-6, XP002812487, Jun. 21, 2019, 6 pages.
CATT, "XR Use Cases, Evaluation Methodologies and Traffic Model", 3GPP TSG RAN WG1 Meeting #103-e, R1-2007843, XP051946524, Oct. 26-Nov. 13, 2020, 10 pages.

* cited by examiner

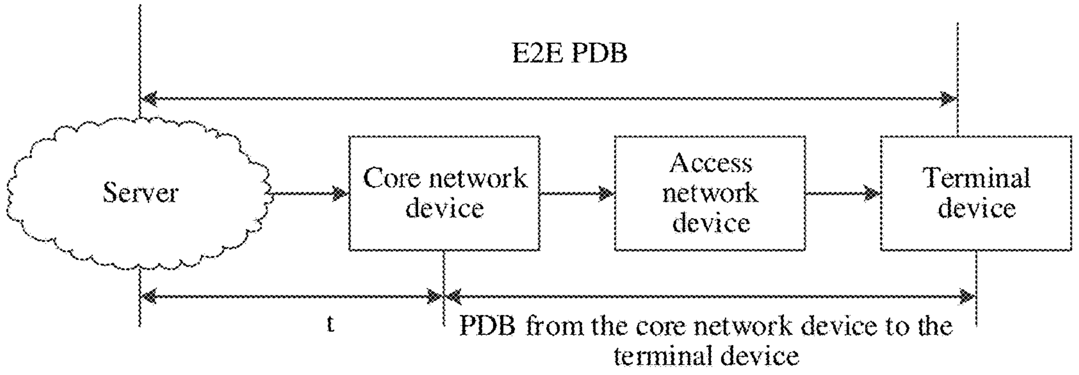

FIG. 10

Server

Core network device

S1101: Obtain an E2E PDB, where the E2E PDB is a PDB of a first data packet from the server to a terminal device S1102: The server generates first information, where the first information is carried in a packet header of a 1st data packet in a first data frame, the first data frame corresponds to at least two data packets, the first information indicates an encoding start moment that is in the server and that is of the first data frame to which the first data packet belongs, and the first data packet is a last data packet in the first data frame S1103: Send the first data packet and the first information S1104: Determine that a transmission delay of the first data packet from the server to the core network device is a difference between a moment at which the first data packet arrives at the core network device and the encoding start moment S1105: Determine that a PDB of the first data packet from the core network device to the terminal device is a difference between the E2E PDB and the transmission delay

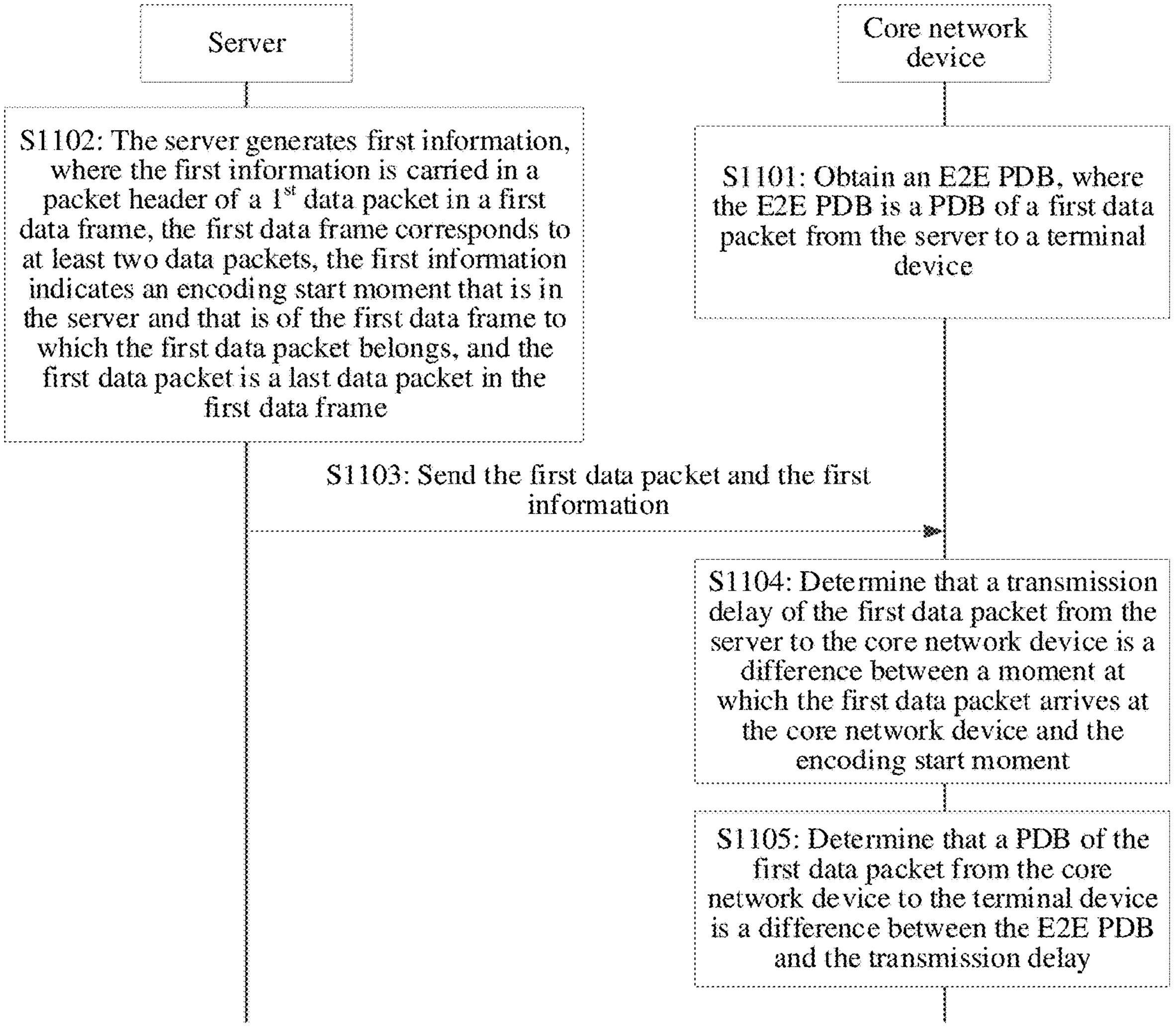

FIG. 11

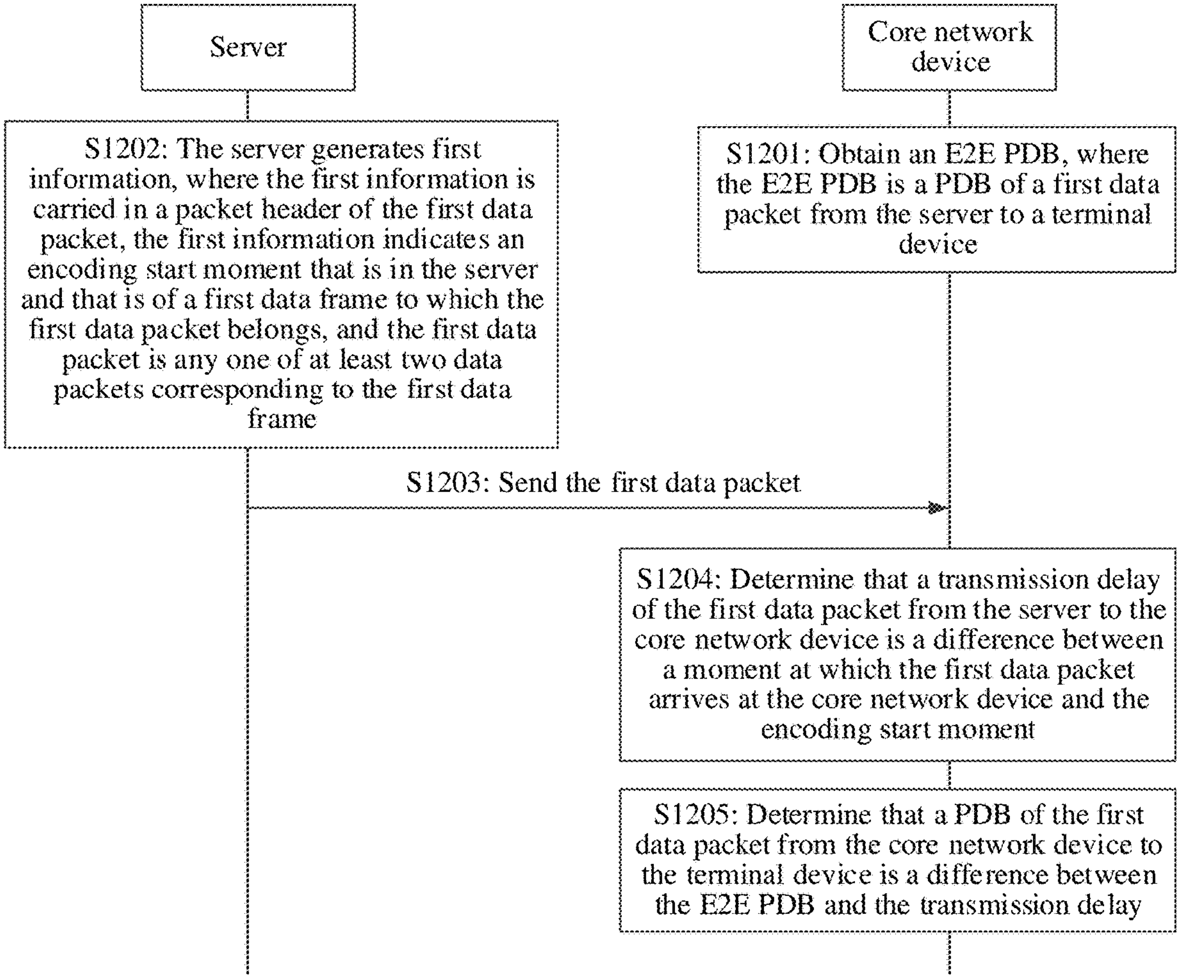

FIG. 12

S1301: Receive a first data packet and first information, where the first information indicates an encoding start moment that is in a server and that is of a first data frame to which a first data packet belongs, the first data frame corresponds to at least two data packets, and the first information is carried in one or more of the at least two data packets S1302: Determine a transmission delay of the first data packet from the server to a communication device based on a moment at which the first data packet arrives at the communication device and the encoding start moment S1303: Determine a PDB of the first data packet from the communication device to a terminal device based on the transmission delay and an end-to-end E2E packet delay budget PDB, where the E2E PDB is a PDB of the first data packet from the server to the terminal device

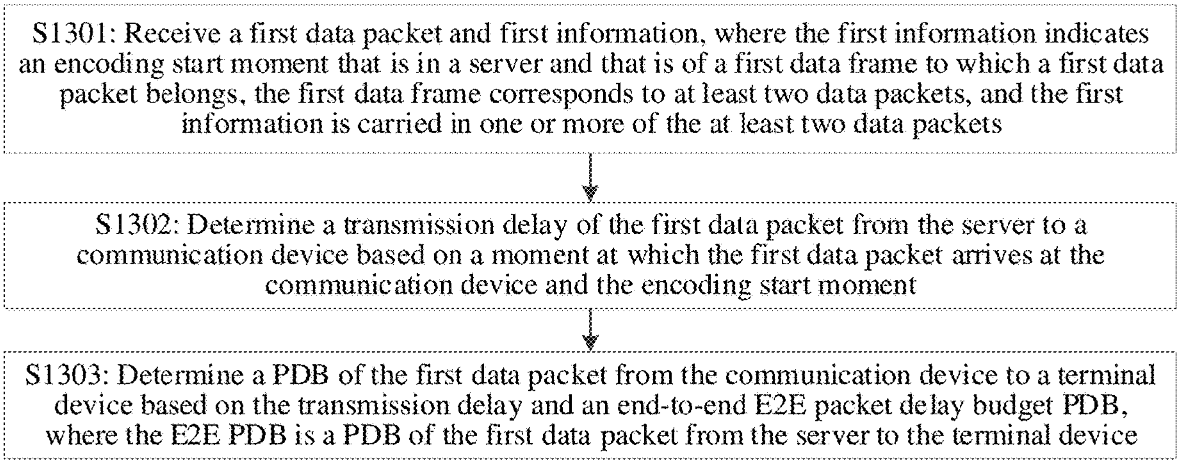

FIG. 13

DELAY BUDGET DETERMINING METHOD AND APPARATUS

CROSS-REFERENCE TO RELATED APPLICATIONS

This application is a continuation of International Application No. PCT/CN2022/115392, filed on Aug. 29, 2022, which claims priority to Chinese Patent Application No. 202111175530.6, filed on Oct. 9, 2021. The disclosures of the aforementioned applications are hereby incorporated by reference in their entireties.

TECHNICAL FIELD

The embodiments relate to the communication field and to a delay budget determining method and apparatus.

BACKGROUND

In a 5th generation (5G) mobile communication system, a packet delay budget (PDB) is defined for delay assurance of a service, for example, for delay assurance of a multimedia service. The PDB refers to an upper limit of a transmission delay of a data packet from a user plane function (UPF) node to a terminal device. More specifically, the PDB includes a packet delay budget from a core network (CN) to an access network (AN) and a packet delay budget from the access network to the terminal device. The packet delay budget from the core network to the access network may be referred to as a CN PDB for short. The packet delay budget from the access network to the terminal device may be referred to as an AN PDB for short.

A corresponding PDB and CN PDB are configured for each service type. An AN PDB may be obtained by calculating a difference between the PDB and the CN PDB. When a data packet of a service type is transmitted to a base station, the base station schedules the data packet of the service type based on an AN PDB corresponding to the service type, so that a delay of the data packet of the service type from the base station to the terminal device does not exceed the AN PDB corresponding to the service type. This ensures a transmission delay of the data packet of the service type.

However, the foregoing method cannot ensure a transmission delay of a data packet of an end-to-end (E2E) delay-sensitive service.

SUMMARY

The embodiments provide a delay budget determining method and apparatus. According to the method, reliable delay assurance can also be provided for an end-to-end delay-sensitive service, to improve user experience.

According to a first aspect, the embodiments provide a delay budget determining method. The method may be performed by a communication device, may be performed by a component (for example, a processor, a chip, or a chip system) of a communication device, or may be implemented by a logical module or software that can implement all or some of functions of a communication device. The method includes: receiving a first data packet and first information, where the first information indicates an encoding start moment that is in a server and that is of a first data frame to which the first data packet belongs, the first data frame corresponds to at least two data packets, the first data packet is a last data packet in the at least two data packets, and the first information is carried in one or more of the at least two data packets; and determining a packet delay budget (PDB) of the first data packet from the communication device to a terminal device based on a moment at which the first data packet arrives at the communication device and the encoding start moment.

In the delay budget determining method provided in this embodiment, the communication device first receives the first data packet and the first information. The first data packet is the last data packet in the first data frame corresponding to the at least two data packets. The first information indicates the encoding start moment that is in the server and that is of the first data frame to which the first data packet belongs. Then, the communication device determines the PDB from the communication device to the terminal device based on the moment at which the first data packet arrives at the communication device and the encoding start moment.

It may be understood that the PDB from the communication device to the terminal device is determined based on the moment at which the first data packet arrives at the communication device and the encoding start moment, to more truly reflect a transmission status of the first data packet, so as to further ensure a transmission delay of a data packet of an end-to-end delay-sensitive service.

For example, it is assumed that, for a video service, when the server sends a video frame (which may be considered as the first data frame, where the video frame corresponds to at least two data packets) of the video service to the terminal device, it means only when a last data packet (which may be considered as a first data packet of the video frame) corresponding to the video frame arrives at the terminal device, that the video frame arrives at the terminal device. Therefore, an arrival moment of the last data packet is an arrival moment of the entire video frame. In this case, to ensure a transmission delay of the first data packet from the communication device (for example, an access network device) to the terminal device, when a PDB from the access network device to the terminal device is determined, in this embodiment, a PDB from the access network device to the terminal device is determined by using a moment at which the first data packet arrives at the access network device and an encoding start moment. For example, a transmission delay of the first data packet from a server to the access network device may be determined by using the moment at which the first data packet arrives at the access network device and the encoding start moment. Then, the PDB of the first data packet from the communication device to the terminal device is determined based on the transmission delay and an E2E PDB of the video frame. For example, in the delay budget determining method in the embodiments, a time consumed from starting encoding by the server to arrival at the access network device is further considered. Therefore, this can further ensure the transmission delay of the data packet of the end-to-end delay-sensitive service.

With reference to the first aspect, in a possible implementation, the first information is carried in a packet header of one of the at least two data packets.

It may be understood that, for a data frame corresponding to a plurality of data packets, encoding start moments of the plurality of data packets are the same. Therefore, in this embodiment, the first information is carried in the packet header of the one of the at least two data packets corresponding to the first data frame, instead of being carried in each of the at least two data packets corresponding to the first data frame. This can reduce overheads of adding the first information to the first data frame.

With reference to the first aspect, in a possible implementation, the determining a PDB of the first data packet from the communication device to a terminal device based on a moment at which the first data packet arrives at the communication device and the encoding start moment includes: determining a transmission delay of the first data packet from the server to the communication device based on the moment at which the first data packet arrives at the communication device and the encoding start moment; and determining the PDB of the first data packet from the communication device to the terminal device based on the transmission delay and an end-to-end (E2E) PDB, where the E2E PDB is a PDB of the first data packet from the server to the terminal device.

In this implementation, the communication device first determines the transmission delay of the first data packet from the server to the communication device by using the moment at which the first data packet arrives at the communication device and the encoding start moment, and then determines the PDB of the first data packet from the communication device to the terminal device based on the transmission delay. It may be understood that the method can more truly reflect the transmission status of the first data packet, and can also more accurately reflect the time consumed when the first data packet is transmitted from the server to the communication device. Consequently, the calculated PDB of the first data packet from the communication device to the terminal device is more accurate.

For example, in a possible implementation, the transmission delay of the first data packet from the server to the communication device is a difference between the moment at which the first data packet arrives at the communication device and the encoding start moment. The PDB of the first data packet from the communication device to the terminal device is a difference between the E2E PDB and the transmission delay.

With reference to the first aspect, in a possible implementation, the method further includes: receiving a second data packet, where the second data packet is any data packet other than the first data packet in the at least two data packets, and a PDB of the second data packet from the communication device to the terminal device is equal to the PDB of the first data packet from the communication device to the terminal device.

It may be understood that the first data packet is the last data packet in the first data frame, that is, the first data packet is a data packet that last arrives at the communication device. Therefore, when the first data packet arrives at the communication device, it means that any data packet (such as the second data packet) before the first data packet also already arrives at the access network device. In this implementation, the calculated PDB of the first data packet is used as a PDB of the second data packet. This can further ensure a transmission delay of the second data packet.

With reference to the first aspect, in a possible implementation, a packet header of the first data packet and a packet header of the second data packet carry a same frame identifier. The frame identifier indicates the first data frame.

In this implementation, the packet header of the first data packet and the packet header of the second data packet carry the same frame identifier. Consequently, when receiving the first data packet and the second data packet, the communication device can determine, by using the frame identifier, that both the first data packet and the second data packet belong to the first data frame.

With reference to the first aspect, in a possible implementation, the communication device is the access network device or a core network device.

In this implementation, when the communication device is the core network device, a PDB of the first data packet from the core network device to the terminal device is determined by using a moment at which the first data packet arrives at the core network device and the encoding start moment. Compared with that in configuring, in the core network device based on different service types, the PDB of the first data packet from the core network device to the terminal device, this can further ensure a transmission delay of the first data packet.

When the communication device is the access network device, the PDB of the first data packet from the core network device to the access network device no longer needs to be configured for the access network device. The access network device can directly determine the PDB of the first data packet from the access network device to the terminal device by using the moment at which the first data packet arrives at the access network device and the encoding start moment.

According to a second aspect, the embodiments provide a delay budget determining method. The method may be performed by a communication device, may be performed by a component (for example, a processor, a chip, or a chip system) of a communication device, or may be implemented by a logical module or software that can implement all or some of functions of a communication device. The method includes: receiving second information, where the second information indicates a first moment at which a terminal device requests a second data frame; and determining a PDB of the second data frame from the communication device to the terminal device based on the first moment, an identifier of the second data frame, a second moment at which the second data frame arrives at the communication device, and a frame rate corresponding to the second data frame.

According to the delay budget determining method provided in this embodiment, the communication device determines the PDB of the second data frame from the communication device to the terminal device based on the first moment, the identifier of the second data frame, the second moment at which the second data frame arrives at the communication device, and the frame rate corresponding to the second data frame. It may be understood that the method can more truly reflect a transmission status of the second data frame, to further ensure a transmission delay of a data packet of an end-to-end delay-sensitive service.

For example, a consumed time of the second data frame from initiating the request for the second data frame by the terminal device to arrival of the second data frame at the communication device is first determined based on the first moment, the identifier of the second data frame, the second moment at which the second data frame arrives at the communication device, and the frame corresponding to the second data frame. Then, the PDB of the second data frame from the communication device to the terminal device is obtained based on a PDB (such as an E2E PDB) from requesting the second data frame by the terminal device to receiving the second data frame by the terminal device.

With reference to the second aspect, in a possible implementation, the PDB of the second data frame from the communication device to the terminal device is further related to the E2E PDB. The E2E PDB is a PDB from requesting the second data frame by the terminal device to receiving the second data frame by the terminal device.

With reference to the second aspect, in a possible implementation, the first moment, the identifier of the second data frame, the second moment, and the frame rate corresponding to the second data frame satisfy the following relational expression:

$$T_n = T_{arrive(n)} - \left(T_{start} + \frac{n-1}{fps}\right)$$

$T_{arrive(n)}$ indicates the second moment, $T_{start}$ indicates the first moment, fps indicates the frame rate corresponding to the second data frame, n indicates the identifier of the second data frame, and $T_n$ indicates a transmission delay occurring when the second data frame arrives at the communication device.

In this implementation, the communication device can determine, according to the foregoing relational expression, a time that is already consumed when the second data frame arrives at the communication device. Consequently, the PDB that is of the second data frame from the communication device to the terminal device and that is determined by the communication device based on the consumed time of the second data frame is more accurate.

With reference to the second aspect, in a possible implementation, the communication device is an access network device or a core network device.

According to a third aspect, the embodiments provide a delay budget determining method. The method may be performed by a communication device, may be performed by a component (for example, a processor, a chip, or a chip system) of a communication device, or may be implemented by a logical module or software that can implement all or some of functions of a communication device. The method includes: receiving a first data packet and first information, where the first information indicates an encoding start moment that is in a server and that is of a first data frame to which the first data packet belongs, the first information is carried in a packet header of the first data packet, the first data frame corresponds to at least two data packets, and the first data packet is any data packet in the at least two data packets; and determining a PDB of the first data packet from the communication device to a terminal device based on a moment at which the first data packet arrives at the communication device and the encoding start moment.

In the delay budget determining method provided in this embodiment, the communication device first receives the first data packet and the first information. The first data packet is the any data packet in the first data frame corresponding to the at least two data packets. The first information indicates the encoding start moment that is in the server and that is of the first data frame to which the first data packet belongs. Then, the communication device determines the PDB from the communication device to the terminal device based on the moment at which the first data packet arrives at the communication device and the encoding start moment. It may be understood that, in the delay budget determining method provided in this embodiment, because the first data packet carries the first information indicating the encoding start moment, the method in this embodiment can be used to implement determining a data packet—level delay budget.

With reference to the third aspect, in a possible implementation, the determining a PDB of the first data packet from the communication device to a terminal device based on a moment at which the first data packet arrives at the communication device and the encoding start moment includes: determining a transmission delay of the first data packet from the server to the communication device based on the moment at which the first data packet arrives at the communication device and the encoding start moment; and determining the PDB of the first data packet from the communication device to the terminal device based on the transmission delay and an E2E PDB, where the E2E PDB is a PDB of the first data packet from the server to the terminal device.

In this implementation, the communication device first determines the transmission delay of the first data packet from the server to the communication device by using the moment at which the first data packet arrives at the communication device and the encoding start moment, and then determines the PDB of the first data packet from the communication device to the terminal device based on the transmission delay. It may be understood that the method can more truly reflect a transmission status of the first data packet, and can also more accurately reflect a time consumed when the first data packet is transmitted from the server to the communication device. Consequently, the calculated PDB of the first data packet from the communication device to the terminal device is more accurate.

For example, in a possible implementation, the transmission delay of the first data packet from the server to the communication device is a difference between the moment at which the first data packet arrives at the communication device and the encoding start moment. The PDB of the first data packet from the communication device to the terminal device is a difference between the E2E PDB and the transmission delay.

According to a fourth aspect, the embodiments provide a delay budget determining apparatus. The apparatus may be a communication device, may be a component (for example, a processor, a chip, or a chip system) of a communication device, or may be a logical module or software that can implement all or some of functions of a communication device. The apparatus includes: an interface module, configured to receive a first data packet and first information, where the first information indicates an encoding start moment that is in a server and that is of a first data frame to which the first data packet belongs, the first data frame corresponds to at least two data packets, the first data packet is a last data packet in the at least two data packets, and the first information is carried in one or more of the at least two data packets; and a processing module, configured to determine a PDB of the first data packet from the communication device to a terminal device based on a moment at which the first data packet arrives at the communication device and the encoding start moment.

With reference to the fourth aspect, in a possible implementation, the first information is carried in a packet header of one of the at least two data packets.

With reference to the fourth aspect, in a possible implementation, the processing module is configured to: determine a transmission delay of the first data packet from the server to the communication device based on the moment at which the first data packet arrives at the communication device and the encoding start moment; and determine the PDB of the first data packet from the communication device to the terminal device based on the transmission delay and an E2E PDB, where the E2E PDB is a PDB of the first data packet from the server to the terminal device.

With reference to the fourth aspect, in a possible implementation, the transmission delay of the first data packet from the server to the communication device is a difference between the moment at which the first data packet arrives at the communication device and the encoding start moment. The PDB of the first data packet from the communication device to the terminal device is a difference between the E2E PDB and the transmission delay.

With reference to the fourth aspect, in a possible implementation, the interface module is further configured to receive a second data packet. The second data packet is any data packet other than the first data packet in the at least two data packets. A PDB of the second data packet from the communication device to the terminal device is equal to the PDB of the first data packet from the communication device to the terminal device.

With reference to the fourth aspect, in a possible implementation, a packet header of the first data packet and a packet header of the second data packet carry a same frame identifier. The frame identifier indicates the first data frame.

With reference to the fourth aspect, in a possible implementation, the communication device is an access network device or a core network device.

According to a fifth aspect, the embodiments provide a delay budget determining apparatus. The apparatus may be a communication device, may be a component (for example, a processor, a chip, or a chip system) of a communication device, or may be a logical module or software that can implement all or some of functions of a communication device. The apparatus includes: an interface module, configured to receive second information, where the second information indicates a first moment at which a terminal device requests a second data frame; and a processing module, configured to determine a PDB of the second data frame from the communication device to the terminal device based on the first moment, an identifier of the second data frame, a second moment at which the second data frame arrives at the communication device, and a frame rate corresponding to the second data frame.

With reference to the fifth aspect, in a possible implementation, the PDB of the second data frame from the communication device to the terminal device is further related to an E2E PDB. The E2E PDB is a PDB from requesting the second data frame by the terminal device to receiving the second data frame by the terminal device.

With reference to the fifth aspect, in a possible implementation, the first moment, the identifier of the second data frame, the second moment, and the frame rate corresponding to the second data frame satisfy the following relational expression:

$$T_n = T_{arrive(n)} - \left(T_{start} + \frac{n-1}{fps}\right)$$

$T_{arrive(n)}$ indicates the second moment, $T_{start}$ indicates the first moment, fps indicates the frame rate corresponding to the second data frame, n indicates the identifier of the second data frame, and $T_n$ indicates a transmission delay occurring when the second data frame arrives at the communication device.

With reference to the fifth aspect, in a possible implementation, the communication device is an access network device or a core network device.

According to a sixth aspect, the embodiments provide a delay budget determining apparatus. The apparatus may be a communication device, may be a component (for example, a processor, a chip, or a chip system) of a communication device, or may be a logical module or software that can implement all or some of functions of a communication device. The apparatus includes: an interface module, configured to receive a first data packet and first information, where the first information indicates an encoding start moment that is in a server and that is of a first data frame to which the first data packet belongs, the first information is carried in a packet header of the first data packet, the first data frame corresponds to at least two data packets, and the first data packet is any data packet in the at least two data packets; and a processing module, configured to determine a PDB of the first data packet from the communication device to a terminal device based on a moment at which the first data packet arrives at the communication device and the encoding start moment.

With reference to the sixth aspect, in a possible implementation, the processing module is configured to: determine a transmission delay of the first data packet from the server to the communication device based on the moment at which the first data packet arrives at the communication device and the encoding start moment; and determine the PDB of the first data packet from the communication device to the terminal device based on the transmission delay and an E2E PDB, where the E2E PDB is a PDB of the first data packet from the server to the terminal device.

According to a seventh aspect, the embodiments provide a delay budget determining apparatus, including a processor. The processor is coupled to a memory. The memory is configured to store a program or instructions. When the program or the instructions are executed by the processor, the apparatus is enabled to perform the method according to any one of the first aspect and the possible implementations of the first aspect, the method according to any one of the second aspect and the possible implementations of the second aspect, or the method according to any one of the third aspect and the possible implementations of the third aspect.

In some implementations, the apparatus may be a chip. In these implementations, optionally, the apparatus may further include a communication interface, configured to communicate with another apparatus or device.

According to an eighth aspect, the embodiments provide a non-transitory computer-readable storage medium. The non-transitory computer-readable storage medium stores instructions to be executed by a computer. When the instructions are executed, the method according to any one of the first aspect and the possible implementations of the first aspect, the method according to any one of the second aspect and the possible implementations of the second aspect, or the method according to any one of the third aspect and the possible implementations of the third aspect is performed.

According to a ninth aspect, the embodiments provide a computer program product. The computer program product includes computer program instructions. When the computer program instructions are run on a computer, the computer is enabled to perform the method according to any one of the first aspect and the possible implementations of the first aspect, the method according to any one of the second aspect and the possible implementations of the second aspect, or the method according to any one of the third aspect and the possible implementations of the third aspect.

For effects brought by any one of the implementations of the fourth aspect to the ninth aspect, refer to the effects brought by any possible implementation method of the first aspect, refer to the effects brought by any possible implementation method of the second aspect, or refer to the effects brought by any possible implementation method of the third aspect. Details are not described again. A delay budget determining method is provided. The method may be performed by a communication device, may be performed by a component (for example, a processor, a chip, or a chip system) of a communication device, or may be implemented by a logical module or software that can implement all or some of functions of a communication device. The method includes: receiving a first data packet and first information, where the first information indicates an encoding start moment that is in a server and that is of a first data frame to which the first data packet belongs, the first data frame corresponds to at least two data packets, the first data packet is a last data packet in the at least two data packets, and the first information is carried in one or more of the at least two data packets; and determining a t PDB of the first data packet from the communication device to a terminal device based on a moment at which the first data packet arrives at the communication device and the encoding start moment.

In the delay budget determining method provided in this embodiment, the communication device first receives the first data packet and the first information. The first data packet is the last data packet in the first data frame corresponding to the at least two data packets. The first information indicates the encoding start moment that is in the server and that is of the first data frame to which the first data packet belongs. Then, the communication device determines the PDB from the communication device to the terminal device based on the moment at which the first data packet arrives at the communication device and the encoding start moment.

It may be understood that the PDB from the communication device to the terminal device is determined based on the moment at which the first data packet arrives at the communication device and the encoding start moment, to more truly reflect a transmission status of the first data packet, so as to further ensure a transmission delay of a data packet of an end-to-end delay-sensitive service.

For example, it is assumed that, for a video service, when the server sends a video frame (which may be considered as the first data frame, where the video frame corresponds to at least two data packets) of the video service to the terminal device, it means only when a last data packet (which may be considered as a first data packet of the video frame) corresponding to the video frame arrives at the terminal device, that the video frame arrives at the terminal device. Therefore, an arrival moment of the last data packet is an arrival moment of the entire video frame. In this case, to ensure a transmission delay of the first data packet from the communication device (for example, an access network device) to the terminal device, when a PDB from the access network device to the terminal device is determined, in this embodiment, a PDB from the access network device to the terminal device is determined by using a moment at which the first data packet arrives at the access network device and an encoding start moment. For example, a transmission delay of the first data packet from a server to the access network device may be determined by using the moment at which the first data packet arrives at the access network device and the encoding start moment. Then, the PDB of the first data packet from the communication device to the terminal device is determined based on the transmission delay and an E2E PDB of the video frame. For example, in the delay budget determining method in the embodiments, a time consumed from starting encoding by the server to arrival at the access network device is further considered. Therefore, this can further ensure the transmission delay of the data packet of the end-to-end delay-sensitive service.

With reference to the first aspect, in a possible implementation, the first information is carried in a packet header of one of the at least two data packets.

It may be understood that, for a data frame corresponding to a plurality of data packets, encoding start moments of the plurality of data packets are the same. Therefore, in this embodiment, the first information is carried in the packet header of the one of the at least two data packets corresponding to the first data frame, instead of being carried in each of the at least two data packets corresponding to the first data frame. This can reduce overheads of adding the first information to the first data frame.

With reference to the first aspect, in a possible implementation, the determining a PDB of the first data packet from the communication device to a terminal device based on a moment at which the first data packet arrives at the communication device and the encoding start moment includes: determining a transmission delay of the first data packet from the server to the communication device based on the moment at which the first data packet arrives at the communication device and the encoding start moment; and determining the PDB of the first data packet from the communication device to the terminal device based on the transmission delay and an E2E PDB, where the E2E PDB is a PDB of the first data packet from the server to the terminal device.

In this implementation, the communication device first determines the transmission delay of the first data packet from the server to the communication device by using the moment at which the first data packet arrives at the communication device and the encoding start moment, and then determines the PDB of the first data packet from the communication device to the terminal device based on the transmission delay. It may be understood that the method can more truly reflect the transmission status of the first data packet, and can also more accurately reflect the time consumed when the first data packet is transmitted from the server to the communication device. Consequently, the calculated PDB of the first data packet from the communication device to the terminal device is more accurate.

For example, in a possible implementation, the transmission delay of the first data packet from the server to the communication device is a difference between the moment at which the first data packet arrives at the communication device and the encoding start moment. The PDB of the first data packet from the communication device to the terminal device is a difference between the E2E PDB and the transmission delay.

With reference to the first aspect, in a possible implementation, the method further includes: receiving a second data packet, where the second data packet is any data packet other than the first data packet in the at least two data packets, and a PDB of the second data packet from the communication device to the terminal device is equal to the PDB of the first data packet from the communication device to the terminal device.

It may be understood that the first data packet is the last data packet in the first data frame, that is, the first data packet is a data packet that last arrives at the communication device. Therefore, when the first data packet arrives at the communication device, it means that any data packet (such as the second data packet) before the first data packet also already arrives at the access network device. In this implementation, the calculated PDB of the first data packet is used as a PDB of the second data packet. This can further ensure a transmission delay of the second data packet.

With reference to the first aspect, in a possible implementation, a packet header of the first data packet and a packet header of the second data packet carry a same frame identifier. The frame identifier indicates the first data frame.

In this implementation, the packet header of the first data packet and the packet header of the second data packet carry the same frame identifier. Consequently, when receiving the first data packet and the second data packet, the communication device can determine, by using the frame identifier, that both the first data packet and the second data packet belong to the first data frame.

With reference to the first aspect, in a possible implementation, the communication device is the access network device or a core network device.

In this implementation, when the communication device is the core network device, a PDB of the first data packet from the core network device to the terminal device is determined by using a moment at which the first data packet arrives at the core network device and the encoding start moment. Compared with that in configuring, in the core network device based on different service types, the PDB of the first data packet from the core network device to the terminal device, this can further ensure a transmission delay of the first data packet.

When the communication device is the access network device, the PDB of the first data packet from the core network device to the access network device no longer needs to be configured for the access network device. The access network device can directly determine the PDB of the first data packet from the access network device to the terminal device by using the moment at which the first data packet arrives at the access network device and the encoding start moment.

According to a second aspect, the embodiments provide a delay budget determining method. The method may be performed by a communication device, may be performed by a component (for example, a processor, a chip, or a chip system) of a communication device, or may be implemented by a logical module or software that can implement all or some of functions of a communication device. The method includes: receiving second information, where the second information indicates a first moment at which a terminal device requests a second data frame; and determining a PDB of the second data frame from the communication device to the terminal device based on the first moment, an identifier of the second data frame, a second moment at which the second data frame arrives at the communication device, and a frame rate corresponding to the second data frame.

According to the delay budget determining method provided in this embodiment, the communication device determines the PDB of the second data frame from the communication device to the terminal device based on the first moment, the identifier of the second data frame, the second moment at which the second data frame arrives at the communication device, and the frame rate corresponding to the second data frame. It may be understood that the method can more truly reflect a transmission status of the second data frame, to further ensure a transmission delay of a data packet of an end-to-end delay-sensitive service.

For example, a consumed time of the second data frame from initiating the request for the second data frame by the terminal device to arrival of the second data frame at the communication device is first determined based on the first moment, the identifier of the second data frame, the second moment at which the second data frame arrives at the communication device, and the frame corresponding to the second data frame. Then, the PDB of the second data frame from the communication device to the terminal device is obtained based on a PDB (such as an E2E PDB) from requesting the second data frame by the terminal device to receiving the second data frame by the terminal device.

With reference to the second aspect, in a possible implementation, the PDB of the second data frame from the communication device to the terminal device is further related to the E2E PDB. The E2E PDB is a PDB from requesting the second data frame by the terminal device to receiving the second data frame by the terminal device.

With reference to the second aspect, in a possible implementation, the first moment, the identifier of the second data frame, the second moment, and the frame rate corresponding to the second data frame satisfy the following relational expression:

$$T_n = T_{arrive(n)} - \left(T_{start} + \frac{n-1}{fps}\right)$$

$T_{arrive(n)}$ indicates the second moment, $T_{start}$ indicates the first moment, fps indicates the frame rate corresponding to the second data frame, n indicates the identifier of the second data frame, and $T_n$ indicates a transmission delay occurring when the second data frame arrives at the communication device.

In this implementation, the communication device can determine, according to the foregoing relational expression, a time that is already consumed when the second data frame arrives at the communication device. Consequently, the PDB that is of the second data frame from the communication device to the terminal device and that is determined by the communication device based on the consumed time of the second data frame is more accurate.

With reference to the second aspect, in a possible implementation, the communication device is an access network device or a core network device.

According to a third aspect, the embodiments provide a delay budget determining method. The method may be performed by a communication device, may be performed by a component (for example, a processor, a chip, or a chip system) of a communication device, or may be implemented by a logical module or software that can implement all or some of functions of a communication device. The method includes: receiving a first data packet and first information, where the first information indicates an encoding start moment that is in a server and that is of a first data frame to which the first data packet belongs, the first information is carried in a packet header of the first data packet, the first data frame corresponds to at least two data packets, and the first data packet is any data packet in the at least two data packets; and determining a PDB of the first data packet from the communication device to a terminal device based on a moment at which the first data packet arrives at the communication device and the encoding start moment.

In the delay budget determining method provided in this embodiment, the communication device first receives the first data packet and the first information. The first data packet is the any data packet in the first data frame corresponding to the at least two data packets. The first information indicates the encoding start moment that is in the server and that is of the first data frame to which the first data packet belongs. Then, the communication device determines the PDB from the communication device to the terminal device based on the moment at which the first data packet arrives at the communication device and the encoding start moment. It may be understood that, in the delay budget determining method provided in this embodiment, because the first data packet carries the first information indicating the encoding start moment, the method in this embodiment can be used to implement determining a data packet—level delay budget.

With reference to the third aspect, in a possible implementation, the determining a PDB of the first data packet from the communication device to a terminal device based on a moment at which the first data packet arrives at the communication device and the encoding start moment includes: determining a transmission delay of the first data packet from the server to the communication device based on the moment at which the first data packet arrives at the communication device and the encoding start moment; and determining the PDB of the first data packet from the communication device to the terminal device based on the transmission delay and an E2E PDB, where the E2E PDB is a PDB of the first data packet from the server to the terminal device.

In this implementation, the communication device first determines the transmission delay of the first data packet from the server to the communication device by using the moment at which the first data packet arrives at the communication device and the encoding start moment, and then determines the PDB of the first data packet from the communication device to the terminal device based on the transmission delay. It may be understood that the method can more truly reflect a transmission status of the first data packet, and can also more accurately reflect a time consumed when the first data packet is transmitted from the server to the communication device. Consequently, the calculated PDB of the first data packet from the communication device to the terminal device is more accurate.

For example, in a possible implementation, the transmission delay of the first data packet from the server to the communication device is a difference between the moment at which the first data packet arrives at the communication device and the encoding start moment. The PDB of the first data packet from the communication device to the terminal device is a difference between the E2E PDB and the transmission delay.

According to a fourth aspect, the embodiments provide a delay budget determining apparatus. The apparatus may be a communication device, may be a component (for example, a processor, a chip, or a chip system) of a communication device, or may be a logical module or software that can implement all or some of functions of a communication device. The apparatus includes: an interface module, configured to receive a first data packet and first information, where the first information indicates an encoding start moment that is in a server and that is of a first data frame to which the first data packet belongs, the first data frame corresponds to at least two data packets, the first data packet is a last data packet in the at least two data packets, and the first information is carried in one or more of the at least two data packets; and a processing module, configured to determine a PDB of the first data packet from the communication device to a terminal device based on a moment at which the first data packet arrives at the communication device and the encoding start moment.

With reference to the fourth aspect, in a possible implementation, the first information is carried in a packet header of one of the at least two data packets.

With reference to the fourth aspect, in a possible implementation, the processing module is configured to: determine a transmission delay of the first data packet from the server to the communication device based on the moment at which the first data packet arrives at the communication device and the encoding start moment; and determine the PDB of the first data packet from the communication device to the terminal device based on the transmission delay and an E2E PDB, where the E2E PDB is a PDB of the first data packet from the server to the terminal device.

With reference to the fourth aspect, in a possible implementation, the transmission delay of the first data packet from the server to the communication device is a difference between the moment at which the first data packet arrives at the communication device and the encoding start moment. The PDB of the first data packet from the communication device to the terminal device is a difference between the E2E PDB and the transmission delay.

With reference to the fourth aspect, in a possible implementation, the interface module is further configured to receive a second data packet. The second data packet is any data packet other than the first data packet in the at least two data packets. A PDB of the second data packet from the communication device to the terminal device is equal to the PDB of the first data packet from the communication device to the terminal device.

With reference to the fourth aspect, in a possible implementation, a packet header of the first data packet and a packet header of the second data packet carry a same frame identifier. The frame identifier indicates the first data frame.

With reference to the fourth aspect, in a possible implementation, the communication device is an access network device or a core network device.

According to a fifth aspect, the embodiments provide a delay budget determining apparatus. The apparatus may be a communication device, may be a component (for example, a processor, a chip, or a chip system) of a communication device, or may be a logical module or software that can implement all or some of functions of a communication device. The apparatus includes: an interface module, configured to receive second information, where the second information indicates a first moment at which a terminal device requests a second data frame; and a processing module, configured to determine a PDB of the second data frame from the communication device to the terminal device based on the first moment, an identifier of the second data frame, a second moment at which the second data frame arrives at the communication device, and a frame rate corresponding to the second data frame.

With reference to the fifth aspect, in a possible implementation, the PDB of the second data frame from the communication device to the terminal device is further related to an E2E PDB. The E2E PDB is a PDB from requesting the second data frame by the terminal device to receiving the second data frame by the terminal device.

With reference to the fifth aspect, in a possible implementation, the first moment, the identifier of the second data frame, the second moment, and the frame rate corresponding to the second data frame satisfy the following relational expression:

$$T_n = T_{arrive(n)} - \left(T_{start} + \frac{n-1}{fps}\right)$$

$T_{arrive(n)}$ indicates the second moment, $T_{start}$ indicates the first moment, fps indicates the frame rate corresponding to the second data frame, n indicates the identifier of the second data frame, and $T_n$ indicates a transmission delay occurring when the second data frame arrives at the communication device.

With reference to the fifth aspect, in a possible implementation, the communication device is an access network device or a core network device.

According to a sixth aspect, the embodiments provide a delay budget determining apparatus. The apparatus may be a communication device, may be a component (for example, a processor, a chip, or a chip system) of a communication device, or may be a logical module or software that can implement all or some of functions of a communication device. The apparatus includes: an interface module, configured to receive a first data packet and first information, where the first information indicates an encoding start moment that is in a server and that is of a first data frame to which the first data packet belongs, the first information is carried in a packet header of the first data packet, the first data frame corresponds to at least two data packets, and the first data packet is any data packet in the at least two data packets; and a processing module, configured to determine a PDB of the first data packet from the communication device to a terminal device based on a moment at which the first data packet arrives at the communication device and the encoding start moment.

With reference to the sixth aspect, in a possible implementation, the processing module is configured to: determine a transmission delay of the first data packet from the server to the communication device based on the moment at which the first data packet arrives at the communication device and the encoding start moment; and determine the PDB of the first data packet from the communication device to the terminal device based on the transmission delay and an E2E PDB, where the E2E PDB is a PDB of the first data packet from the server to the terminal device.

According to a seventh aspect, the embodiments provide a delay budget determining apparatus, including a processor. The processor is coupled to a memory. The memory is configured to store a program or instructions. When the program or the instructions are executed by the processor, the apparatus is enabled to perform the method according to any one of the first aspect and the possible implementations of the first aspect, the method according to any one of the second aspect and the possible implementations of the second aspect, or the method according to any one of the third aspect and the possible implementations of the third aspect.

In some implementations, the apparatus may be a chip. In these implementations, optionally, the apparatus may further include a communication interface, configured to communicate with another apparatus or device.

According to an eighth aspect, the embodiments provide a non-transitory computer-readable storage medium. The non-transitory computer-readable storage medium stores instructions to be executed by a computer. When the instructions are executed, the method according to any one of the first aspect and the possible implementations of the first aspect, the method according to any one of the second aspect and the possible implementations of the second aspect, or the method according to any one of the third aspect and the possible implementations of the third aspect is performed.

According to a ninth aspect, the embodiments provide a computer program product. The computer program product includes computer program instructions. When the computer program instructions are run on a computer, the computer is enabled to perform the method according to any one of the first aspect and the possible implementations of the first aspect, the method according to any one of the second aspect and the possible implementations of the second aspect, or the method according to any one of the third aspect and the possible implementations of the third aspect.

For effects brought by any one of the implementations of the fourth aspect to the ninth aspect, refer to the effects brought by any possible implementation method of the first aspect, refer to the effects brought by any possible implementation method of the second aspect, or refer to the effects brought by any possible implementation method of the third aspect. Details are not described again.

BRIEF DESCRIPTION OF DRAWINGS

FIG. 10 is a diagram of a structure of composition of a delay budget according to an embodiment;

FIG. 11 is a schematic flowchart of a delay budget determining method according to another embodiment;

FIG. 12 is a schematic flowchart of a delay budget determining method according to still another embodiment;

FIG. 13 is a schematic flowchart of a delay budget determining method according to an embodiment;

DETAILED DESCRIPTION OF EMBODIMENTS

A network architecture and a service scenario that are described in embodiments are intended to describe the solutions in embodiments more clearly, and make no limitation on the solutions provided in embodiments. A person of ordinary skill in the art may know that, with evolution of the network architecture and emergence of a new service scenario, the solutions provided in embodiments are also applicable to similar problems.

Figure 1:
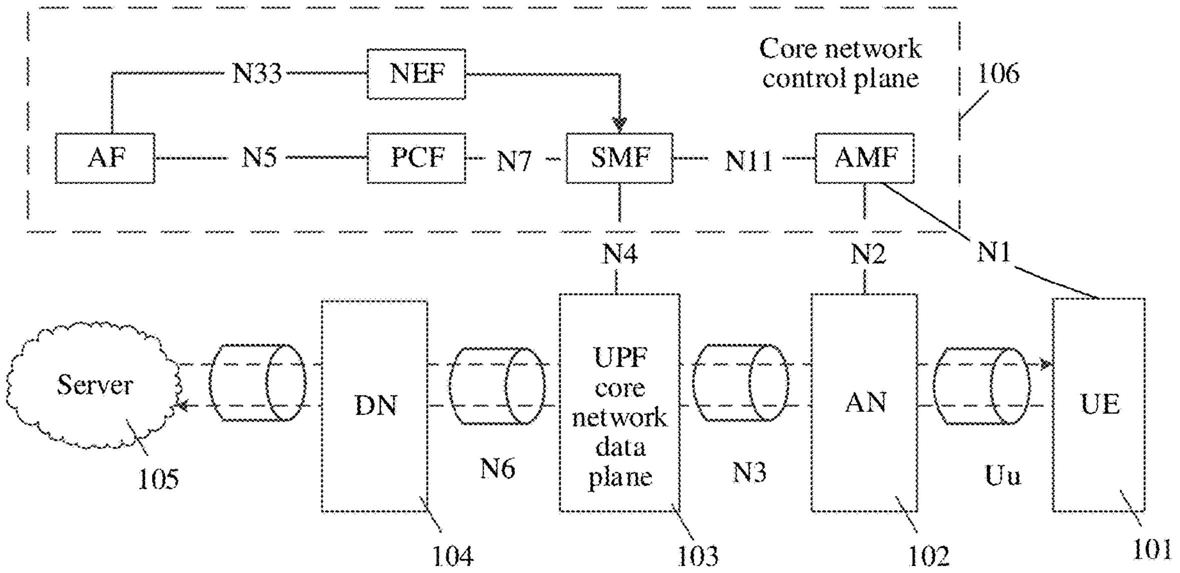
FIG. 1 is a diagram of a structure of a network architecture according to the embodiments.

FIG. 1 is a diagram of a structure of a network architecture according to an embodiment. The network architecture is a 5th generation (5G) network architecture. Network elements in the 5G network architecture include a user equipment (UE) 101, an access network (AN) 102, a user plane function (UPF) 103 on a core network (, CN) data plane, a data network (DN) 104, a server 105, and a core network control plane 106.

The UE 101 may also be referred to as a terminal device, a mobile station, a mobile terminal, a terminal, or the like. The UE may be widely used in various scenarios, for example, device-to-device (D2D) communication, vehicle-to-everything (V2X) communication, machine-type communication (MTC), an internet of things (JOT), virtual reality, augmented reality, industrial control, autonomous driving, telemedicine, a smart grid, smart furniture, smart office, smart wear, smart transportation, and a smart city. The terminal may be a mobile phone, a tablet computer, a computer with a wireless transceiver function, a wearable device, a vehicle, an uncrewed aerial vehicle, a helicopter, an airplane, a ship, a robot, a robot arm, a smart home device, or the like. A specific technology and a specific device form that are used by the terminal are not limited in embodiments.

A main function of the AN 102 is to control the UE 101 to wirelessly access a mobile communication network. The AN 102 is a part of the mobile communication system, and implements a radio access technology. For example, the AN 102 may be a base station, an evolved base station (evolved NodeB, eNodeB), a transmission reception point (TRP), a next generation NodeB (next generation NodeB, gNB) in a 5G mobile communication system, a next generation base station in a 6th generation (6G) mobile communication system, a base station in a future mobile communication system, or an access node in a Wi-Fi system, or may be a module or a unit completing some of functions of a base station, for example, may be a central unit (CU), or may be a distributed unit (DU). A radio access network device may be a macro base station, may be a micro base station or an indoor station, or may be a relay node, a donor node, or the like. It may be understood that all or some of functions of the radio access network device in the embodiments may alternatively be implemented by using a software function running on hardware, or may be implemented by using an instantiated virtualization function on a platform (for example, a cloud platform). A specific technology and a specific device form that are used by the radio access network device are not limited in embodiments. For ease of description, the following provides descriptions by using an example in which the radio access network device is a base station.

The UE 101 and the AN 102 may be deployed on land, including indoor, outdoor, handheld, or vehicle-mounted deployment, may be deployed on a water surface, or may be deployed on an airplane, a balloon, or an artificial satellite in the air. An application scenario of the AN 102 and the UE 101 is not limited in embodiments.

The AN 102 and the UE 101 may communicate with each other by using a licensed spectrum, may communicate with each other by using an unlicensed spectrum, or may communicate with each other by using both a licensed spectrum and an unlicensed spectrum; or may communicate with each other by using a spectrum below 6 gigahertz (GHz), may communicate with each other by using a spectrum above 6 GHz, or may communicate with each other by using a spectrum below 6 GHz and a spectrum above 6 GHz. A spectrum resource used for wireless communication is not limited in embodiments.

In embodiments, the function of the base station may alternatively be performed by a module (for example, a chip) in the base station, or may be performed by a control subsystem including a base station function. The control subsystem that includes the base station function herein may be a control center in an application scenario of the foregoing terminal, for example, the smart grid, industrial control, smart transportation, and the smart city. A function of the terminal may alternatively be performed by a module (for example, a chip or a modem) in the terminal, or may be performed by an apparatus including a terminal function.

The UPF 103 is a functional unit of a user plane, and can be responsible for packet data packet forwarding, quality of service (QoS) control, charging information statistics collection, a connection to an external network, and the like. The UPF 103 includes related functions of a serving gateway (SGW) and a public data network gateway (PDN-GW) of a long term evolution (LTE) technology.

The DN 104 is a network responsible for providing a service for the UE 101. For example, some DNs provide an internet access function for the UE 101, and some other DNs provide an SMS message function for the UE 101.

The server 105 is a device that communicates with the UE 101, and can send service data to the UE 101, for example, data of a video service or data of a voice service. This is not limited in embodiments.

The core network control plane 106 can be responsible for service procedure interaction, delivering a data packet forwarding policy and a QoS control policy, and the like to a user plane, and the like. For example, as shown in FIG. 1, control plane network elements in the core network control plane 106 include a mobility management function (access and mobility function, AMF), a session management function (SMF), a policy control function (PCF), an application function (AF), and a network exposure function (NEF). The AMF can be responsible for access and mobility management of the UE 101. The SMF can be responsible for creating, deleting, and the like of a user protocol data unit (PDU) session, and maintaining a PDU session context and user plane forwarding pipeline information. The PCF is similar to a policy and charging rules function (PCRF) network element in the long term evolution (LTE) technology, and can be responsible for performing policy control, including generating and managing the user, a session, a quality of service (QoS) flow processing policy, and quality of service, generating a charging rule, and delivering a corresponding rule to the UPF network element by using the SMF. The AF can be responsible for providing functions of various services, can interact with a core network by using the NEF network element, and can interact with a policy management framework to perform policy management. The NEF is configured to: provide a framework, authentication, and an interface that are related to network capability exposure, and transmit information between a network function of a 5G system and another network function.

In the network architecture shown in FIG. 1, the UE 101 and the AMF communicate with each other through an N1 interface. The N1 interface is configured to transmit non-access stratum (NAS) signaling. The AN 102 and the AMF communicate with each other through an N2 interface. The AN 102 and the UPF 103 communicated with each other through an N3 interface. The N3 interface is used to perform tunnel transmission of user data by using a GPRS tunneling protocol for the user plane (GTP-U). The UPF 103 and the SMF communicate with each other through an N4 interface. The N4 interface is configured to perform policy configuration and the like on the UPF 103. The UPF 103 and the external DN 104 communicate with each other through an N6 interface. In a specific scenario, the N6 interface needs to support a dedicated line or an L2/L3 tunnel, and may communicate with a DN based on an internet protocol (IP).

It should be noted herein that each network element in embodiments may be the network element mentioned in the foregoing embodiment, or may be a network element that has a same function as the foregoing network element in a future communication system. For example, the user plane function network element may be the UPF network element, or may be a network element that has a same function as the UPF network element in the future communication system. The application function network element may be the AF network element, or may be a network element that has a same function as the AF network element. The policy management network element may be the PCF network element, or may be a network element that has a same function as the PCF network element.

For the communication system shown in FIG. 1, the server 105 may communicate with the UE 101 by using the DN 104, the UPF 103, the core network control plane 106, and the AN 102. For example, a video stream service on the server 105 is transmitted to the UE 101 by using the DN 104, the UPF 103, the core network control plane 106, and the AN 102.

Figure 2:
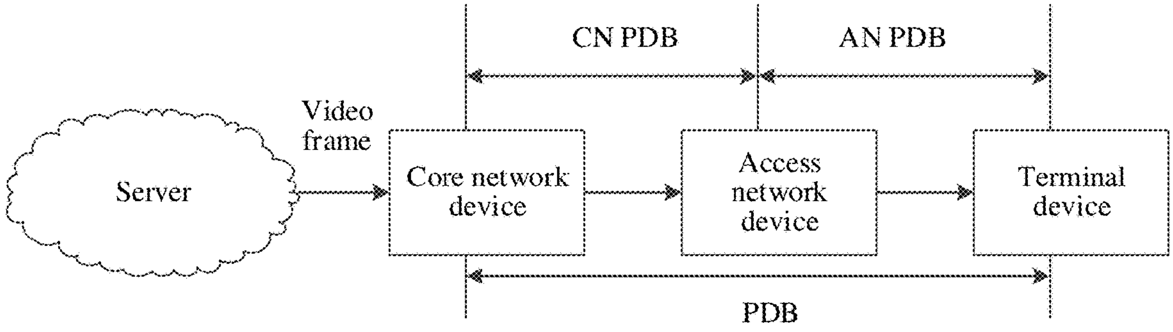
FIG. 2 is a diagram of a structure of a delay budget determining method according to the embodiments.

Currently, in a 5G mobile communication system, a packet delay budget (PDB) is defined for delay assurance of a service, for example, for delay assurance of a multimedia service. The PDB refers to an upper limit of a transmission delay of a data packet from a UPF node to a terminal device. The 5G network shown in FIG. 1 is used as an example. It may be understood that, after a data packet arrives at the UPF 103, the UPF 103 needs to deliver the data packet to the UE 101 in the PDB. For example, as shown in FIG. 2, the PDB includes a packet delay budget from a core network device to an access network device and a packet delay budget from the access network device to the terminal device. The packet delay budget from the core network device to the access network device may be referred to as a CN PDB for short. The packet delay budget from the access network device to the terminal device may be referred to as an AN PDB for short.

For each service type, a corresponding PDB and CN PDB are configured. An AN PDB may be obtained by calculating a difference between the PDB and the CN PDB. When a data packet of a service type is transmitted to the access network device, the access network device schedules the data packet of the service type based on an AN PDB corresponding to the service type, so that a delay of the data packet of the service type from the access network device to the terminal device does not exceed the AN PDB corresponding to the service type. This ensures a transmission delay of the data packet of the service type.

It may be understood that, with development of a communication system, including development of the 5G mobile communication system, rapid development of many real-time multimedia services, for example, video streaming, cloud gaming, and extended reality (XR), is promoted. Compared with another conventional service, XR, including virtual reality (VR) and augmented reality (AR), has advantages such as a high-definition multi-view advantage and strong interaction, provides brand new visual experience for a user, and has great application value and commercial potential. Currently, XR is already applied to related fields such as education, entertainment, military, medical care, environmental protection, transportation, and public health. However, an XR service imposes a stricter requirement on a network transmission delay. For example, in a cloud VR service, if motion-to-photon (MTP) latency is greater than 20 ms, the user may be dizzy and uncomfortable, affecting user experience.

Therefore, for an end-to-end delay-sensitive service like XR, arrival timeout of a data packet greatly affects user experience. However, in an existing protocol, only a transmission delay in the 5G network is considered, that is, only a delay from the core network device to the terminal device is considered. For the end-to-end (E2E) delay-sensitive service, only the delay from the core network device to the terminal device is considered, and a delay requirement of the end-to-end delay-sensitive service may not be met. Consequently, a transmission delay of the data packet of the delay-sensitive service cannot be ensured. FIG. 2 is used as an example. For a delay-sensitive service, an E2E delay required by the delay-sensitive service is 70 ms, that is, a transmission delay of a data packet from the server to the UE cannot exceed 70 ms. In this case, if 65 ms already elapses from starting to encode the data packet of the service by the server to arrival of the data packet at the AN, but the access network device still schedules the data packet subsequently by using, as a delay budget, 10 ms configured for the data packet, a requirement that the E2E delay required by the service is 70 ms may not be met. As a result, reliable delay assurance cannot be provided for the delay-sensitive service.

In view of this, embodiments provide a new delay budget determining method. In the method, a communication device (for example, an access network device or a core network device) that performs the delay budget determining method first determines a time consumed when a first data packet arrives at the communication device, and then determines a delay budget of the first data packet from the communication device to a terminal device based on the consumed time and an end-to-end packet delay budget (also referred to as an E2E PDB). The determined delay budget is a delay budget determined based on the actually consumed time of the first data packet. Therefore, for an end-to-end delay-sensitive service, a delay budget determined by using the method can ensure a transmission delay of data packet of the end-to-end delay-sensitive service.

Figure 3:
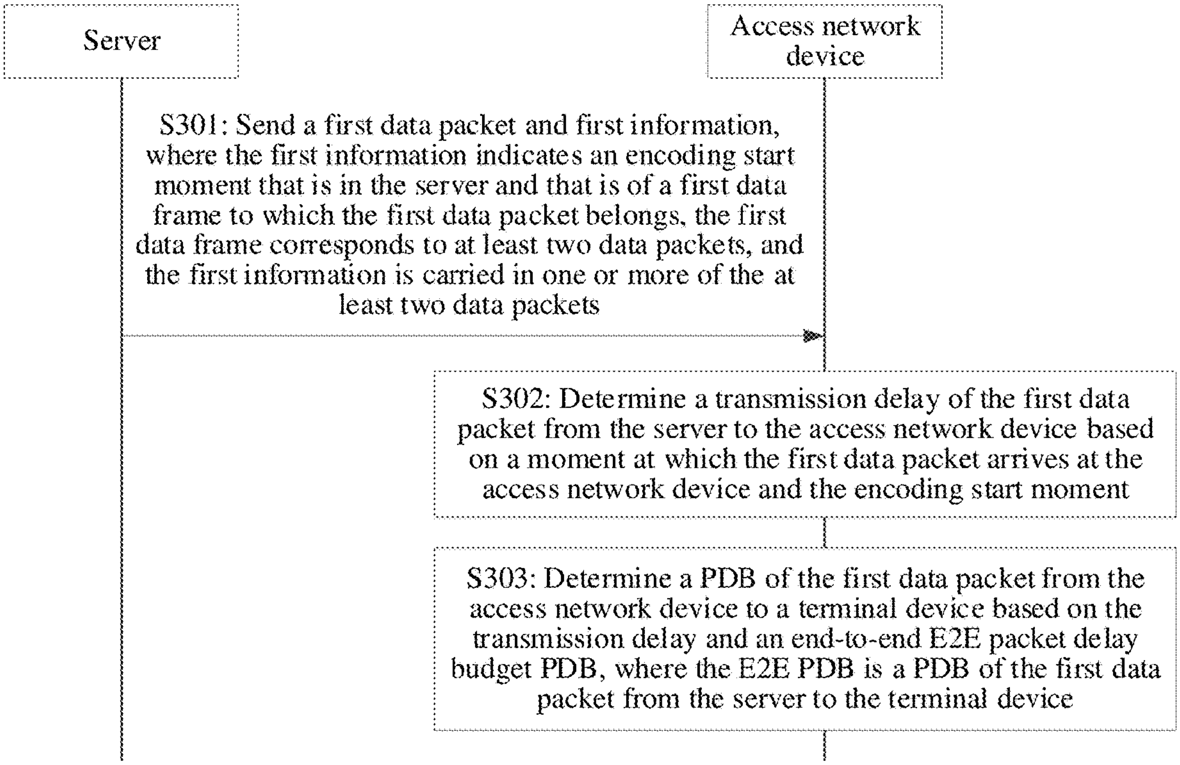
FIG. 3 is a schematic flowchart of a delay budget determining method according to an embodiment.

With reference to FIG. 3, the following describes the delay budget determining method in embodiments when the communication device is the access network device. In FIG. 3, an example in which an access network device and a server are used as execution bodies of the interaction example is used to illustrate the method. However, the execution bodies of the interaction example are not limited. For example, the access network device in FIG. 3 may alternatively be a chip, a chip system, or a processor that supports the access network device in implementing the method, or may be a logical module or software that can implement all or some of functions of the access network device. The server in FIG. 3 may alternatively be a chip, a chip system, or a processor that supports the server in implementing the method, or may be a logical module or software that can implement all or some of functions of the server.

FIG. 3 is a schematic flowchart of a delay budget determining method according to an embodiment. As shown in FIG. 3, the method in this embodiment may include S301, S302, and S303. The delay budget determining method may be performed by the AN 102 in the communication system shown in FIG. 1.

S301: The server sends a first data packet and first information to the access network device. Correspondingly, the access network device receives the first data packet and the first information. The first information indicates an encoding start moment that is in the server and that is of a first data frame to which the first data packet belongs. The first data frame corresponds to at least two data packets. The first information is carried in one or more of the at least two data packets.

For example, the first data packet is a data packet of a first service type. For example, a first service is a video service, a voice session service, or a real-time game service. Correspondingly, when the first service is the video service, the first data packet is a data packet of a video service type. When the first service is the voice session service, the first data packet is a data packet of a voice session service type. This is not limited in embodiments.

That the first data frame corresponds to the at least two data packets may also be considered as that the first data frame includes a plurality of data packets. In this case, the first data packet is one of the plurality of data packets included in the first data frame.

For example, the first data frame may be a video frame or a voice frame. This is not limited in this embodiment.

It may be understood that, when sending content of a service to the terminal device, the server converts the content into a data packet for sending. However, for the terminal device, to identify the content, a minimum granularity of the content may be a first data frame including a plurality of data packets. For example, for the video service, the terminal device displays a video frame, and each video frame actually includes a plurality of data packets.

It may be further understood that, if the server needs to send the first data packet to the access network device, the first data packet needs to be encoded in the server. In addition, for the first data frame to which the first data packet belongs, encoding start moments of the plurality of data packets included in the first data frame are the same. For example, for a video frame of a video service, if the video frame includes 100 data packets, encoding start moments of the 100 data packets are the same.

In this embodiment, when sending the first data packet to the access network device, the server indicates, to the access network device by carrying the first information in a packet header of the data packet, an encoding start moment that is in the server and that is of the first data frame to which the first data packet belongs.

S302: The access network device determines a transmission delay of the first data packet from the server to the access network device based on a moment at which the first data packet arrives at the access network device and the encoding start moment.

The transmission delay may be understood as a time consumed when the first data packet is transmitted from one device to another device.

It may be understood that, if the server needs to send the first data packet to the terminal device, the first data packet first arrives at a core network device through a data network, and then arrives at the access network device from the core network device. When the first data packet arrives at the access network device, the access network device schedules the first data packet, and sends the first data packet to the terminal device. Therefore, regardless of whether the first data packet is transmitted from the server to the core network device or from the server to the access network device, there is a corresponding transmission delay.

It may be further understood that, when the first data packet is transmitted from the server to the access network device, there is a corresponding arrival moment of the first data packet, such as the moment at which the first data packet arrives at the access network device.

In this embodiment, the access network device determines the transmission delay of the first data packet from the server to the access network device based on the moment at which the first data packet arrives at the access network device and the encoding start moment.

In a possible implementation, the access network device may determine that the transmission delay of the first data packet from the server to the access network device is a difference between the moment at which the first data packet arrives at the access network device and the encoding start moment. For example, if the moment at which the first data packet arrives at the access network device is 0 s 60 ms, and the encoding start moment of the first data frame to which the first data packet belongs is 0 s 20 ms, the transmission delay of the first data packet from the server to the access network device is a difference between 0 s 60 ms and 0 s 20 ms. In other words, 40 ms is consumed when the first data packet is transmitted from the server to the access network device.

It should be understood that the transmission delay of the first data packet from the server to the access network device is determined based on the difference between the moment at which the first data packet arrives at the access network device and the encoding start moment, and this can more truly reflect a transmission status of the first data packet, and can also more accurately reflect the time consumed when the first data packet is transmitted from the server to the access network device.

S303: The access network device determines a PDB of the first data packet from the access network device to the terminal device based on the transmission delay and an E2E PDB, where the E2E PDB is a PDB of the first data packet from the server to the terminal device.

With development of a communication system, including development of a 5G mobile communication system, rapid development of many delay-sensitive services is promoted. For the delay-sensitive service, to improve user experience, it is generally required that an end-to-end delay of a data packet of the delay-sensitive service from the server to the terminal device cannot exceed a time threshold, such as an E2E PDB.

In this embodiment, the E2E PDB may be considered as a maximum value of a transmission delay of the first data packet from the server to the terminal device.

Figure 4:
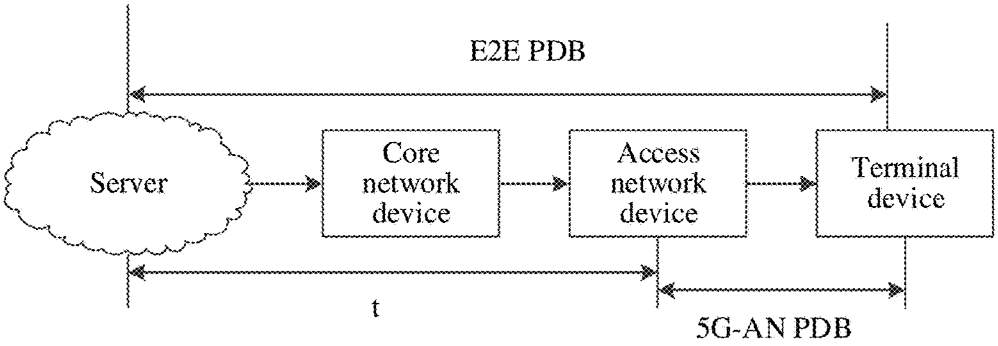
FIG. 4 is a diagram of a structure of composition of a delay budget according to an embodiment.

For example, the E2E PDB in this embodiment may include the transmission delay of the first data packet from the server to the access network device and a transmission delay of the first data packet from the access network device to the terminal device. As shown in FIG. 4, t indicates the time consumed when the first data packet is transmitted from the server to the access network device. A 5G-AN PDB indicates a remaining air interface delay budget between the access network device and the terminal device. A sum of t and the remaining air interface delay budget is equal to the E2E PDB.

Therefore, in this embodiment, after determining the transmission delay of the first data packet from the server to the access network device, the access network device can determine the transmission delay of the first data packet from the access network device to the terminal device.

In a possible implementation, the PDB of the first data packet from the access network device to the terminal device is a difference between the E2E PDB and the transmission delay. For example, if a moment at which a first data packet of a service arrives at the access network device is 0 s 60 ms, and an encoding start moment is 0 s 20 ms, a transmission delay occurring when the first data packet is transmitted from the server to the access network device is 40 ms. In this case, if an E2E PDB of the service is required to be 50 ms, a PDB of the first data packet from the access network device to the terminal device is 10 ms.

Further, after determining the PDB of the first data packet from the access network device to the terminal device, the access network device may schedule the first data packet based on the PDB. This ensures the transmission delay of the first data packet.

According to the delay budget determining method provided in embodiments, the access network device calculates the time consumed from starting to encode the first data packet in the server to arrival of the first data packet at the access network device, and then determines the PDB of the first data packet from the access network device to the terminal device based on the E2E PDB corresponding to the first data packet. Consequently, even for the end-to-end delay-sensitive service, this can also ensure the transmission delay of the data packet of the delay-sensitive service.

In an optional embodiment, in a possible implementation, the first information that indicates the encoding start moment and that is sent by the server to the access network device is carried in a packet header of one of the at least two data packets. For example, the first information is carried in a packet header of a 1st data packet.

Optionally, the first data packet is a last data packet in the at least two data packets corresponding to the first data frame.

Figure 5:
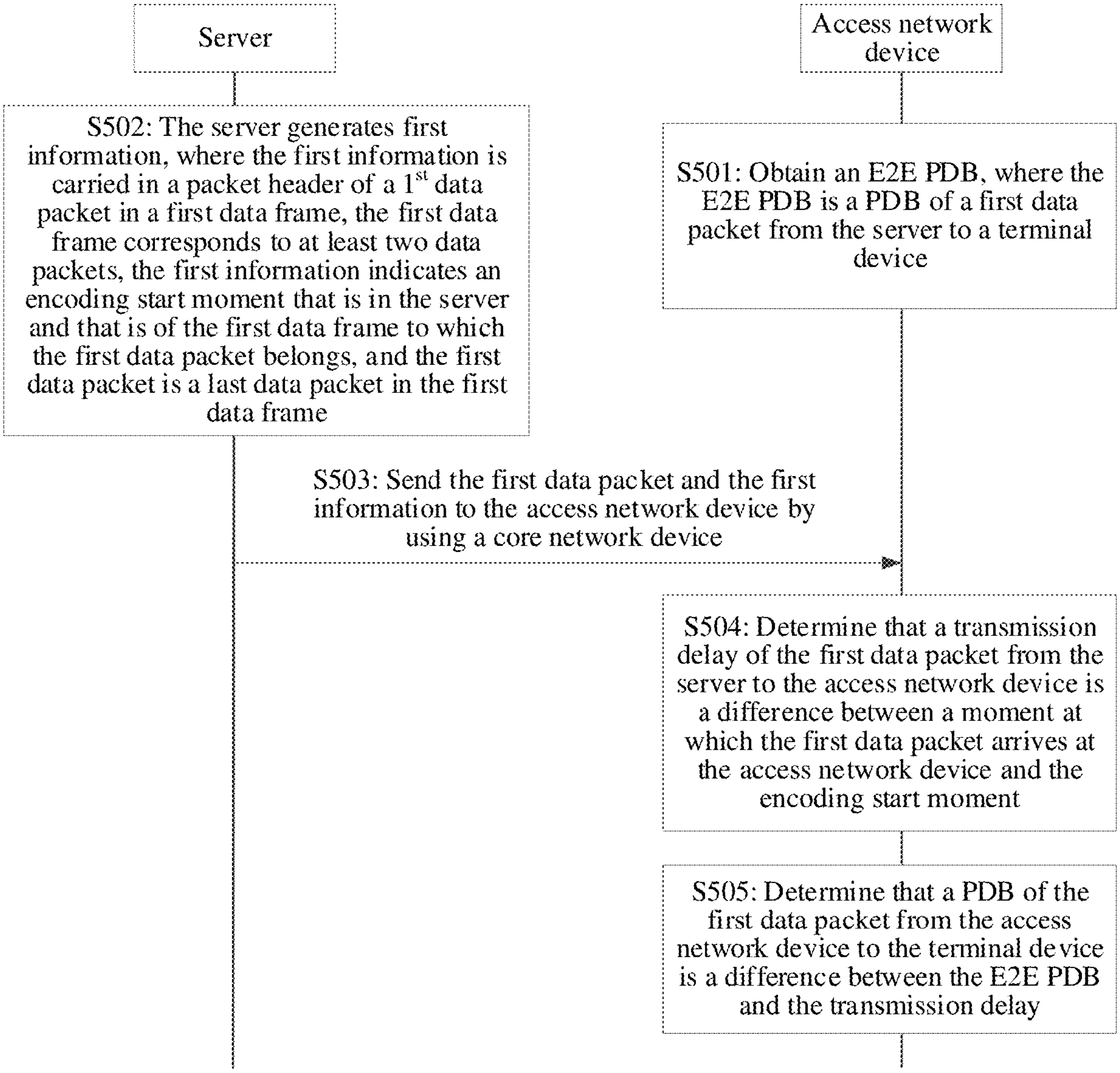
FIG. 5 is a schematic flowchart of a delay budget determining method according to another embodiment.

With reference to FIG. 5, the following describes in detail the delay budget determining method performed by the access network device in embodiments when the first information is carried in the packet header of the Pt data packet in the first data frame and the first data packet is the last data packet in the first data frame. In FIG. 5, an example in which an access network device and a server are used as execution bodies of the interaction example is used to illustrate the method. However, the execution bodies of the interaction example are not limited. For example, the access network device in FIG. 5 may alternatively be a chip, a chip system, or a processor that supports the access network device in implementing the method, or may be a logical module or software that can implement all or some of functions of the access network device. The server in FIG. 5 may alternatively be a chip, a chip system, or a processor that supports the server in implementing the method, or may be a logical module or software that can implement all or some of functions of the server.

FIG. 5 is a schematic flowchart of a delay budget determining method according to another embodiment. As shown in FIG. 5, the method in this embodiment may include S501, S502, S503, S504, and S505. The delay budget determining method may be performed by the AN 102 in the communication system shown in FIG. 1. In this embodiment, a service type of a data frame to which a first data packet belongs is a first service type.

S501: The access network device obtains an E2E PDB, where the E2E PDB is a PDB of the first data packet from the server to a terminal device.

For a concept of the E2E PDB, refer to the descriptions in the embodiment in FIG. 3. Details are not described herein again.

It should be noted herein that a manner in which the access network device obtains the E2E PDB is not limited in this embodiment.

For example, in a possible implementation, the E2E PDB may be preconfigured in the access network device.

For another example, in another possible implementation, a field E2E PDB may be added to a QoS profile to indicate the end-to-end packet delay budget. Then, after a PDU session is established, an SMF in a core network control plane provides the field E2E PDB for the access network device through an N2 interface. It should be noted herein that, that the SMF provides the field E2E PDB for the access network device through the N2 interface herein means that the SMF first provides the field E2E PDB for an AMF through an N11 interface, and then the AMF provides the field E2E PDB for the access network device through the N2 interface.

For example, the QoS profile includes the following parameters, as shown in Table 1. The end-to-end packet delay budget E2E PDB is a newly added parameter in this embodiment, and other parameters are parameters included in an existing QoS profile. For specific meanings, refer to descriptions in the conventional technology. Details are not described herein again.

TABLE 1

Example of adding fields to the QoS profile

| QoS flow attribute | Descriptions |
|---|---|
| 5G QoS identifier | The 5G QoS identifier indicates a wireless feature of a QoS flow, and is available for each QoS flow. |
| Allocation and retention priority ARP | The allocation and retention priority is a priority of the QoS flow over an NG interface, and is applicable to QoS flows between different UEs or QoS flows in one UE, and available for each QoS flow. |
| Guaranteed flow bit rate (GFBR) | The guaranteed flow bit rate is a guaranteed data rate, is available only for a guaranteed bit rate (Guaranteed Bit Rate, GBR) QoS flow, and includes uplink and downlink guaranteed flow bit rates. |
| Maximum flow bit rate (MFBR) | The maximum flow bit rate is a maximum data rate, is available only for the GBR QoS flow, and includes uplink and downlink data maximum flow bit rates. |
| Notification control | The notification control indicates whether a base station reports an index value of the QoS flow to a 5GC when the QoS cannot be met, is available only for the GBR QoS, and is optional. |
| Maximum packet loss rate (MPLR) | The maximum packet loss rate indicates a maximum packet loss rate that can be tolerated by a QoS flow. A maximum packet loss rate parameter can be provided only on the GBR QoS flow. |
| End-to-end packet delay budget (E2E PDB) | An end-to-end network transmission delay budget is configured based on a service type. For example, 70 ms is for an XR service. |

S502: The server generates first information, where the first information is carried in a packet header of a $1^{st}$ data packet of a first data frame, the first data frame corresponds to at least two data packets, the first information indicates an encoding start moment that is in the server and that is of the first data frame to which the first data packet belongs, and the first data packet is a last data packet in the first data frame.

In this embodiment, for a concept of the first data frame, refer to the descriptions in the embodiment in FIG. 3. Details are not described herein again.

A manner in which the server generates the first information is as follows: The server adds a timestamp label to the $1^{st}$ data packet in the generated first data frame. The timestamp indicates a moment at which the first data frame starts to be encoded, for example, is represented by $T_{start}$.

Figure 6:
FIG. 6 is a diagram of a structure of adding a timestamp label according to an embodiment.
Figure 7:
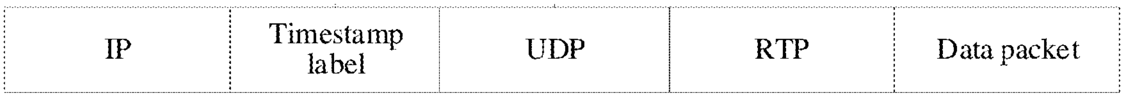
FIG. 7 is a diagram of a structure of adding a timestamp label according to another embodiment.

It should be noted herein that a specific location at which the timestamp label is added is not limited in this embodiment. For example, as shown in FIG. 6, the timestamp label may be added between a user datagram protocol (UDP) and a real-time transport protocol (RTP). Alternatively, as shown in FIG. 7, the timestamp label may be added between a UDP and an internet protocol (IP).

It should be further noted herein that an existing computer network protocol includes a plurality of protocol layers, for example, an RTP protocol layer, a UDP protocol layer, and an IP protocol layer. Each protocol layer adds a packet header to a data packet to form a data packet that conforms to a network transmission protocol. For example, if an original data packet payload generated by the server passes through the RTP protocol layer, an RTP protocol header is added before the original data packet.

In another possible implementation, the server may send a plurality of data frames. Therefore, when the server sends the data frame, to enable a network element in a network to determine a data frame corresponding to each data packet, the server may further label a frame number for each data packet included in the data frame. For example, the frame number label and the foregoing timestamp label may be put together.

S503: The server sends the first data packet and the first information to the access network device by using a core network device. Correspondingly, the access network device receives the first data packet and the first information by using the core network device.

In a possible implementation, after the PDU session is established, the core network device may read information in the packet header of the $1^{st}$ data packet in the first data frame by using a UPF, to obtain the timestamp label. Then, information about the timestamp label is encapsulated into a GTP-U protocol extension field (the extension field is also referred to as a GTP-U extension header in this embodiment) by using a GTP user (GTP user, GTP-U) protocol. Then, the GTP-U protocol extension field is transmitted to the access network device through an N3 interface. Optionally, when each data packet included in the first data frame further includes a frame number label, the timestamp label and the frame number label are encapsulated into the GTP-U protocol extension field (the extension field is also referred to as the GTP-U extension header in this embodiment) by using the GTP user (GTP user, GTP-U) protocol. Then, the GTP-U protocol extension field is transmitted to the access network device through the N3 interface.

For example, Table 2 shows an addition manner of adding a timestamp field and a frame number field to the GTP-U extension header (which is an extension of a GTP-U header). A prerequisite for this addition manner is that the GTP-U header indicates existence of a next extension type.

TABLE 2

Example of extending the GTP-U extension header

| | |
|---|---|
| Field 1 | Frame number label |
| Field 2 | Timestamp label |
| Field 3 | Next extension type |

For detailed descriptions of the GTP-U protocol, refer to an implementation in the conventional technology. Details are not described herein again.

S504: The access network device determines that a transmission delay of the first data packet from the server to the access network device is a difference between a moment at which the first data packet arrives at the access network device and the encoding start moment.

In this embodiment, when the access network device receives the first data frame, the access network device may obtain the encoding start moment $T_{start}$ of the first data frame by detecting a data packet (the $1^{st}$ data packet existing only in the first data frame in this embodiment) that carries a timestamp label. Optionally, when a plurality of received data packets all include frame number labels, a data frame to which each data packet belongs may be determined based on a frame number label of each data packet. In addition, for one data frame, encoding start moments of a plurality of data packets included in the data frame are the same.

In this embodiment, the first data packet is the last data packet in the first data frame, such as a data packet that last arrives at the access network device. For example, an arrival moment of the first data packet is represented by $T_{(arrive)}$.

In this embodiment, after obtaining the encoding start moment $T_{start}$ of the first data packet (such as the last data packet) and the moment $T_{(arrive)}$ at which the first data packet arrives at the access network device, the access network device may determine that a time consumed when the first data packet starts, from the encoding start moment, to be transmitted to the access network device is the difference between the moment at which the first data packet arrives at the access network device and the encoding start moment. It is assumed that the consumed time is represented by t. In this case, $t=T_{(arrive)}-T_{start}$.

S505: The access network device determines that a PDB of the first data packet from the access network device to the terminal device is a difference between the E2E PDB and the transmission delay.

For example, the E2E PDB in this embodiment may include the transmission delay of the first data packet from the server to the access network device and a transmission delay of the first data packet from the access network device to the terminal device. Therefore, in this embodiment, after the access network device determines the transmission delay of the first data packet from the server to the access network device, the PDB of the first data packet from the access network device to the terminal device is equal to the difference between the E2E PDB and the transmission delay of the first data packet from the server to the access network device.

It should be further understood that, in the delay budget determining method provided in this embodiment, because a quantity of bytes occupied by a timestamp may be large, the server only adds a timestamp to the lst data packet in the first data frame, instead of adding a timestamp to each data packet in the first data frame. This can reduce overheads of adding the timestamp to the first data frame.

According to the delay budget determining method provided in embodiments, the first data packet is the last data packet in the first data frame. Therefore, the moment at which the first data packet arrives at the access network device is latest. In this case, the difference between the arrival moment of the first data packet and the encoding start moment is largest. On the contrary, the PDB that is from the access network device to the terminal device and that is determined based on the transmission delay of the last data packet from the server to the access network device is smallest. Therefore, the PDB that is from the access network device to the terminal device and that is determined by using the last data packet can be considered as a frame-level PDB.

Optionally, based on the embodiment shown in FIG. 5, the method further includes: the server sends a second data packet. The second data packet is any data packet other than the first data packet in the first data frame. Correspondingly, the access network device receives the second data packet.

A PDB of the second data packet from the access network device to the terminal device is equal to the PDB of the first data packet from the access network device to the terminal device.

It should be understood that, in this embodiment, the first data packet is the last data packet in the first data frame, that is, the first data packet is the data packet that last arrives at the access network device. Therefore, when the first data packet arrives at the access network device, it means that any data packet (such as the second data packet) before the first data packet also already arrives at the access network device.

Therefore, the calculated PDB of the first data packet is used as the PDB of the second data packet. This can further ensure a transmission delay of the second data packet.

In an optional embodiment, in a possible implementation, the first information that indicates the encoding start moment and that is sent by the server to the access network device is carried in a packet header of the first data packet. The first data packet is any data packet in the first data frame.

Figure 8:
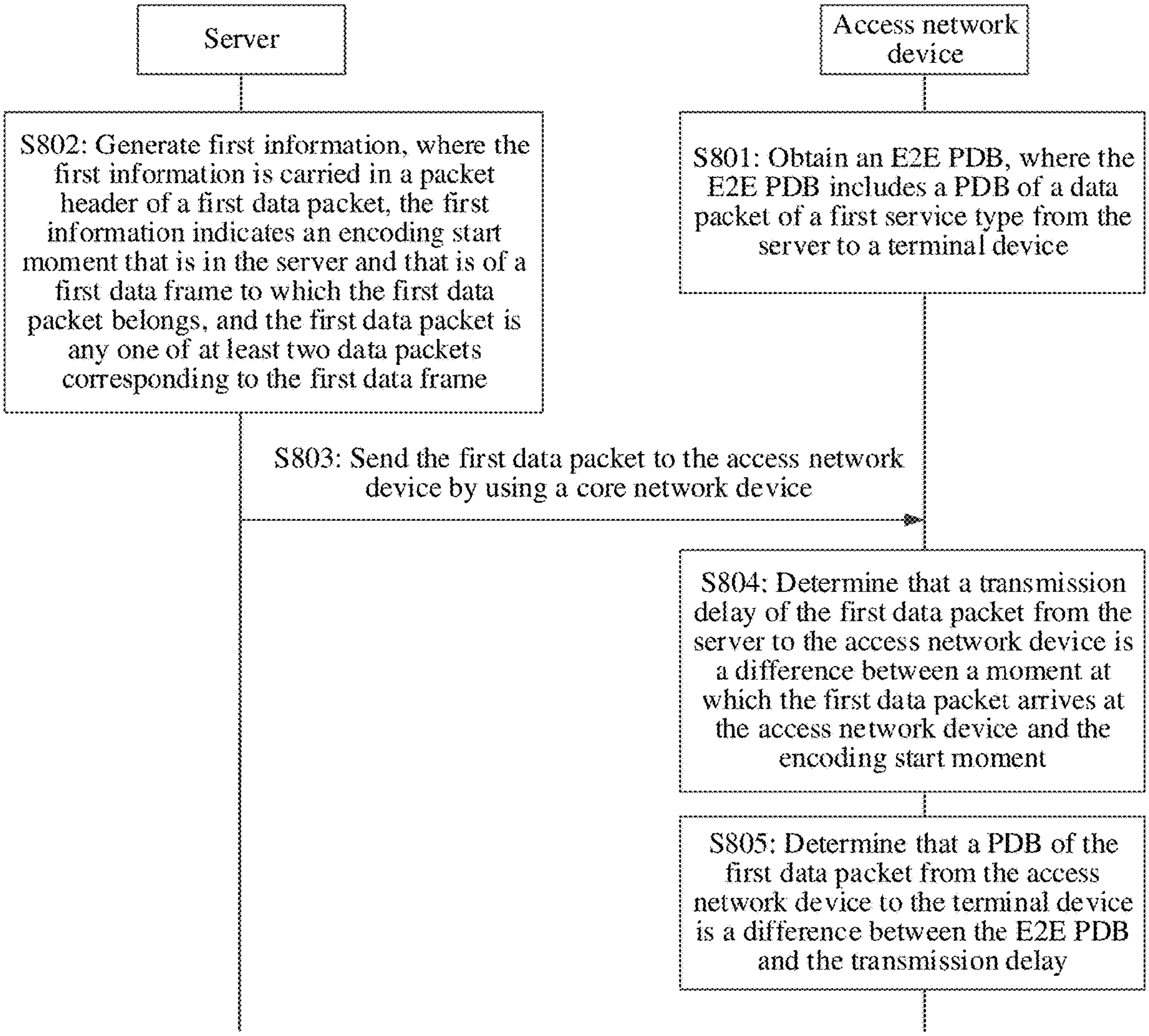
FIG. 8 is a schematic flowchart of a delay budget determining method according to an embodiment.

With reference to FIG. 8, the following describes in detail the delay budget determining method provided in embodiments when the first information is carried in the packet header of the first data packet and the first data packet is the any data packet in the first data frame. In FIG. 8, an example in which an access network device and a server are used as execution bodies of the interaction example is used to illustrate the method. However, the execution bodies of the interaction example are not limited. For example, the access network device in FIG. 8 may alternatively be a chip, a chip system, or a processor that supports the access network device in implementing the method, or may be a logical module or software that can implement all or some of functions of the access network device. The server in FIG. 8 may alternatively be a chip, a chip system, or a processor that supports the server in implementing the method, or may be a logical module or software that can implement all or some of functions of the server.

FIG. 8 is a schematic flowchart of a delay budget determining method according to still another embodiment. As shown in FIG. 8, the method in this embodiment may include S801, S802, S803, S804, and S805. The delay budget determining method may be performed by the AN 102 in the communication system shown in FIG. 1.

S801: The access network device obtains an E2E PDB, where the E2E PDB is a PDB of a first data packet from the server to a terminal device.

For detailed descriptions of this step, refer to the descriptions of S501 in the embodiment shown in FIG. 5. Details are not described herein again.

S802: The server generates first information, where the first information is carried in a packet header of the first data packet, the first information indicates an encoding start moment that is in the server and that is of a first data frame to which the first data packet belongs, and the first data packet is any one of at least two data packets corresponding to the first data frame.

For a concept of the first data frame, refer to descriptions in the foregoing embodiments. Details are not described herein again.

It should be noted herein that a difference between this step and step S502 in the embodiment shown in FIG. 5 is that the first data packet in this embodiment is any one of a plurality of data packets included in the first data frame. For example, the first data packet is a $k^{th}$ data packet in the first data frame.

Encoding start moments of a plurality of data packets in a same data frame are the same. Therefore, in this embodiment, for the first data frame including the first data packet, when generating the first information, the server does not need to add a frame number label to each data packet in the first data frame to indicate a relationship between the data packet and the first data frame, but only needs to determine, by using a timestamp label of each data packet, whether the data packet belongs to the first data frame.

For example, a manner in which the server generates the first information is as follows: The server adds a timestamp label to the first data packet in the generated first data frame. The timestamp indicates a moment at which the first data frame starts to be encoded, for example, is represented by $T_{start}$. For an implementation of adding the first data packet, refer to the descriptions of S502 in the embodiment shown in FIG. 5. Details are not described herein again.

S803: The server sends the first data packet to the access network device by using a core network device. Correspondingly, the access network device receives the first data packet by using the core network device.

It may be understood that, in this embodiment, because the first information is carried in the first data packet, sending the first data packet to the access network device by the server includes sending the first information to the access network device.

For detailed descriptions about how the server sends the first data packet to the access network device by using the core network device, refer to the descriptions of S503 in the embodiment shown in FIG. 5. Details are not described herein again.

S804: The access network device determines that a transmission delay of the first data packet from the server to the access network device is a difference between a moment at which the first data packet arrives at the access network device and the encoding start moment.

In this embodiment, when receiving the first data packet, the access network device can obtain the first information in the first data packet, such as the encoding start moment of the first data frame to which the first data packet belongs. In this case, when the first data packet arrives at the access network device, the access network device can calculate the difference between the moment at which the first data packet arrives at the access network device and the encoding start moment carried in the first data packet, and then determine the difference as the transmission delay of the first data packet from the server to the access network device.

S805: The access network device determines that a PDB of the first data packet from the access network device to the terminal device is a difference between the E2E PDB and the transmission delay.

For detailed descriptions of this step, refer to the descriptions of S505 in the embodiment shown in FIG. 5. Details are not described herein again.

It should be further understood that a difference between the delay budget determining method provided in this embodiment and the delay budget determining method provided in FIG. 5 is that the server in this embodiment adds timestamp labels to all the data packets in the first data frame. Therefore, a time consumed when any data packet is transmitted from the server to the access network device can be determined by using a moment at which the data packet arrives at the access network device. In other words, a data packet—level delay budget is completed in the method in this embodiment.

With reference to the accompanying drawings, the foregoing describes the delay budget determining method performed by the access network device. With reference to FIG. 9 to FIG. 12, the following describes a delay budget determining method performed by the core network device.

Figure 9:
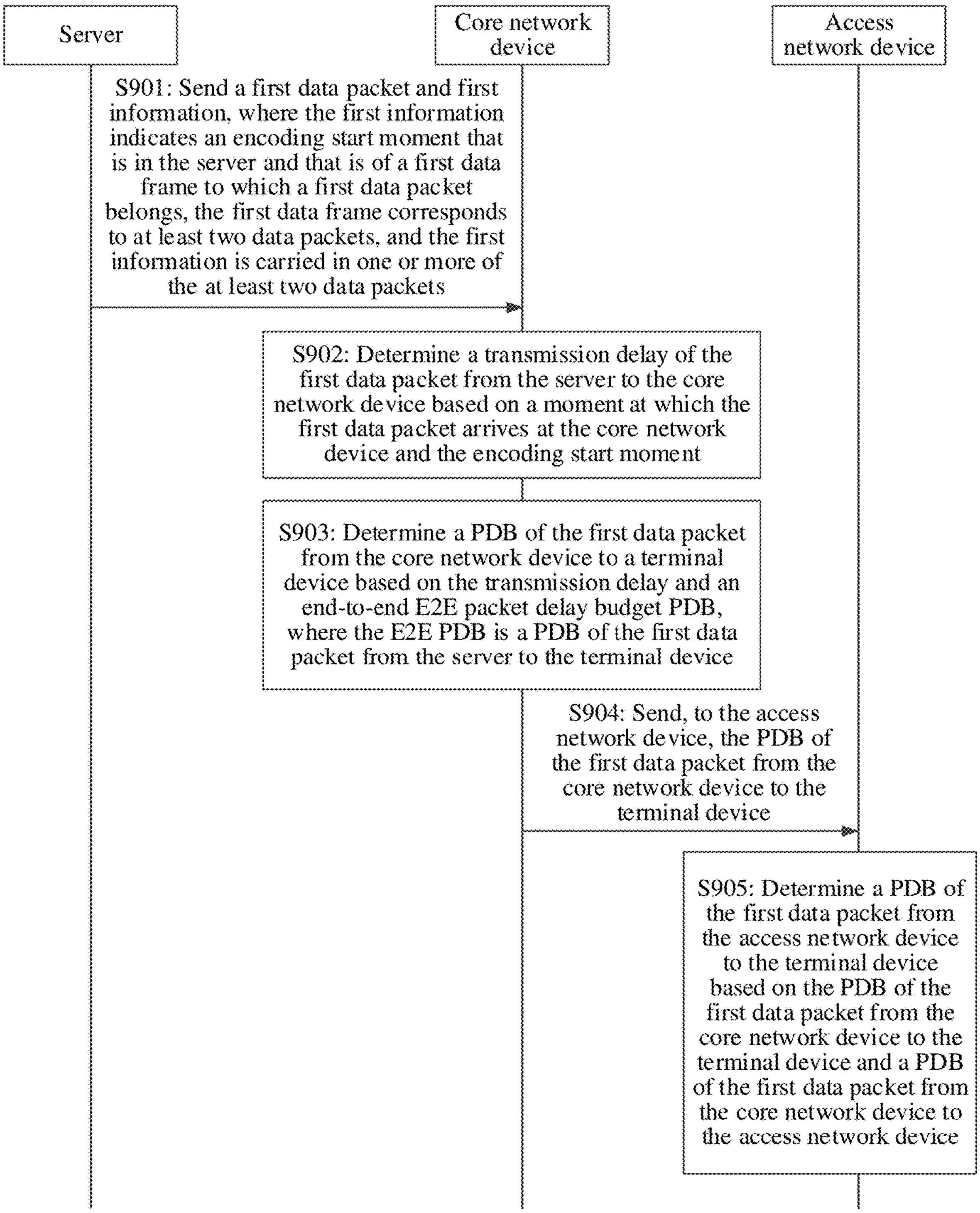
FIG. 9 is a schematic flowchart of a delay budget determining method according to another embodiment.

FIG. 9 is a schematic flowchart of a delay budget determining method according to an embodiment. As shown in FIG. 9, the method in this embodiment may include S901, S902, and S903. The delay budget determining method may be performed by the core network device in the communication system shown in FIG. 1. In FIG. 9, an example in which the core network device, an access network device, and a server are used as execution bodies of the interaction example is used to illustrate the method. However, the execution bodies of the interaction example are not limited. For example, the core network device in FIG. 9 may alternatively be a chip, a chip system, or a processor that supports the core network device in implementing the method, or may be a logical module or software that can implement all or some of functions of the core network device. The access network device in FIG. 9 may alternatively be a chip, a chip system, or a processor that supports the access network device in implementing the method, or may be a logical module or software that can implement all or some of functions of the access network device. The server in FIG. 9 may alternatively be a chip, a chip system, or a processor that supports the server in implementing the method, or may be a logical module or software that can implement all or some of functions of the server.

S901: The server sends a first data packet and first information to the core network device. Correspondingly, the core network device receives the first data packet and the first information. The first information indicates an encoding start moment that is in the server and that is of a first data frame to which the first data packet belongs. The first data frame corresponds to at least two data packets. The first information is carried in one or more of the at least two data packets.

In this embodiment, for related descriptions of the first data packet, the first information, and the first data frame, refer to the detailed descriptions of step S301 in the embodiment shown in FIG. 3. Details are not described herein again.

S902: The core network device determines a transmission delay of the first data packet from the server to the core network device based on a moment at which the first data packet arrives at the core network device and the encoding start moment.

For a concept and detailed descriptions of the transmission delay, refer to the descriptions of S302 in the embodiment shown in FIG. 3. Details are not described herein again.

It may be understood that, when the first data packet is transmitted from the server to the core network device, there is a corresponding arrival moment of the first data packet, such as the moment at which the first data packet arrives at the core network device.

In this embodiment, the core network device determines the transmission delay of the first data packet from the server to the core network device by using the moment at which the first data packet arrives at the core network device and the encoding start moment.

In a possible implementation, the core network device may determine that the transmission delay of the first data packet from the server to the core network device is a difference between the moment at which the first data packet arrives at the core network device and the encoding start moment. For example, if the moment at which the first data packet arrives at the core network device is 0 s 40 ms, and the encoding start moment is 0 s 20 ms, the transmission delay of transmitting the first data packet from the server to the core network device is a difference between 0 s 40 ms and 0 s 20 ms. In other words, 20 ms is consumed when the first data packet is transmitted from the server to the core network device.

It should be understood that the transmission delay of the first data packet from the server to the core network device is determined by using the difference between the moment at which the first data packet arrives at the core network device and the encoding start moment, and this can more truly reflect a transmission status of the first data packet, and can also more accurately reflect the time consumed when the first data packet is transmitted from the server to the core network device.

S903: The core network device determines a PDB of the first data packet from the core network device to a terminal device based on the transmission delay and an E2E PDB, where the E2E PDB is a PDB of the first data packet from the server to the terminal device.

In this embodiment, for a concept of the E2E PDB, refer to the descriptions of S303 in the embodiment in FIG. 3. Details are not described herein again.

For example, the E2E PDB in this embodiment may include the transmission delay of the first data packet from the server to the core network device and a transmission delay of the first data packet from the core network device to the terminal device. As shown in FIG. 10, t indicates a time consumed when the first data packet is transmitted from the server to the core network device. A sum oft and the PDB of the first data packet from the core network device to the terminal device is equal to the E2E PDB.

In a possible implementation, the PDB of the first data packet from the core network device to the terminal device is a difference between the E2E PDB and the transmission delay. For example, if a moment at which a first data packet of a service arrives at the core network device is 0 s 40 ms, and an encoding start moment is 0 s 20 ms, a transmission delay occurring when the first data packet is transmitted from the server to the core network device is 20 ms. In this case, if an E2E PDB of the service is required to be 50 ms, a PDB of the first data packet from the core network device to the terminal device is 30 ms.

According to the delay budget determining method provided in embodiments, the core network device calculates the time consumed from starting to generate the first data packet in the server to arrival of the first data packet at the core network device, and then determines the PDB of the first data packet from the core network device to the terminal device based on the E2E PDB corresponding to the first data packet.

Optionally, after the core network device determines the PDB of the first data packet from the core network device to the terminal device, the method may further include S904 and S905.

S904: The core network device sends, to the access network device, the PDB of the first data packet from the core network device to the terminal device. Correspondingly, the access network device receives the PDB of the first data packet from the core network device to the terminal device.

S905: The access network device determines a PDB of the first data packet from the access network device to the terminal device based on the PDB of the first data packet from the core network device to the terminal device and a PDB of the first data packet from the core network device to the access network device.

In a possible implementation, the PDB of the first data packet from the access network device to the terminal device is a difference between the PDB of the first data packet from the core network device to the terminal device and the PDB from the core network device to the access network device.

It should be noted herein that a manner in which the access network device obtains the PDB from the core network device to the access network device is not limited in embodiments.

For example, in a possible implementation, the PDB of the first data packet from the core network device to the access network device may be preconfigured in the access network device.

For another example, in another possible implementation, the PDB of the first data packet from the core network device to the access network device may be preconfigured in the core network device, and then the core network device sends the PDB to the access network device.

Further, after determining the PDB of the first data packet from the access network device to the terminal device based on the PDB of the first data packet from the core network device to the terminal device and the PDB from the core network device to the access network device, the access network device may schedule the first data packet in the PDB from the access network device to the terminal device. This ensures a transmission delay of the first data packet.

In an optional embodiment, in a possible implementation, the first information that indicates the encoding start moment and that is sent by the server to the access network device is carried in a packet header of one of the at least two data packets. For example, the first information is carried in a packet header of a lst data packet.

Optionally, the first data packet is a last data packet in the at least two data packets corresponding to the first data frame.

With reference to FIG. 11, the following describes in detail the delay budget determining method performed by the core network device in embodiments when the first information is carried in the packet header of the Pt data packet in the first data frame and the first data packet is the last data packet in the first data frame. In FIG. 11, an example in which a core network device and a server are used as execution bodies of the interaction example is used to illustrate the method. However, the execution bodies of the interaction example are not limited. For example, the core network device in FIG. 11 may alternatively be a chip, a chip system, or a processor that supports the core network device in implementing the method, or may be a logical module or software that can implement all or some of functions of the core network device. The server in FIG. 11 may alternatively be a chip, a chip system, or a processor that supports the server in implementing the method, or may be a logical module or software that can implement all or some of functions of the server.

FIG. 11 is a schematic flowchart of a delay budget determining method according to another embodiment. As shown in FIG. 11, the method in this embodiment may include S1101, S1102, S1103, S1104, and S1105. The delay budget determining method may be performed by the core network device in the communication system shown in FIG. 1. In this embodiment, a service type of a data frame to which a first data packet belongs is a first service type.

S1101: The core network device obtains an E2E PDB, where the E2E PDB is a PDB of the first data packet from the server to a terminal device.

For example, in a possible implementation, the E2E PDB may be preconfigured in the core network device.

For another example, in another possible implementation, the server may send the E2E PDB to the core network device.

For detailed descriptions of the E2E PDB, refer to the descriptions in the foregoing embodiments. Details are not described herein again.

S1102: The server generates first information, where the first information is carried in a packet header of a $1^{st}$ data packet of a first data frame, the first data frame corresponds to at least two data packets, the first information indicates an encoding start moment that is in the server and that is of the first data frame to which the first data packet belongs, and the first data packet is a last data packet in the first data frame.

It should be noted herein that, for detailed descriptions of this step, refer to the descriptions of S502 in the embodiment shown in FIG. 5. Details are not described herein again.

S1103: The server sends the first data packet and the first information to the core network device. Correspondingly, the core network device receives the first data packet and the first information.

S1104: The core network device determines that a transmission delay of the first data packet from the server to the core network device is a difference between a moment at which the first data packet arrives at the core network device and the encoding start moment.

In a possible implementation, when the core network device receives the first data frame, the core network device may obtain the encoding start moment $T_{start}$ of the first data frame by detecting a data packet (the $1^{st}$ data packet existing only in the first data frame) that carries a timestamp label. Optionally, when a plurality of received data packets all include frame number labels, a data frame to which each data packet belongs may be determined based on a frame number label of each data packet. In addition, for one data frame, encoding start moments of a plurality of data packets included in the data frame are the same.

In this embodiment, the first data packet is the last data packet in the first data frame, such as a data packet that last arrives at the core network device. For example, an arrival moment of the first data packet is represented by $T_{arrive)}$.

In this embodiment, after obtaining the encoding start moment $T_{start}$ of the first data packet (such as the last data packet) and the moment $T_{(arrive)}$ at which the first data packet arrives at the access network device, the core network device may determine that a time consumed when the first data packet starts, from the encoding start moment, to be transmitted to the core network device is the difference between the moment at which the first data packet arrives at the core network device and the encoding start moment. It is assumed that the consumed time is represented by t. In this case, $t=T_{(arrive)}-T_{start}$.

S1105: The core network device determines that a PDB of the first data packet from the core network device to the terminal device is a difference between the E2E PDB and the transmission delay.

For example, the E2E PDB in this embodiment may include the transmission delay of the first data packet from the server to the core network device and a transmission delay of the first data packet from the core network device to the terminal device. Therefore, in this embodiment, after the core network device determines the transmission delay of the first data packet from the server to the core network device, the PDB of the first data packet from the core network device to the terminal device is equal to the difference between the E2E PDB and the transmission delay of the first data packet from the server to the core network device.

According to the delay budget determining method provided in this embodiment, a delay budget of the last data packet from the core network device to the terminal device is determined by using the E2E PDB and the time consumed when the last data packet in the first data frame arrives at the core network device from the server. It may be further understood that, because the first data packet is the data packet that last arrives at the core network device, the moment at which the first data packet arrives at the core network device is latest. In this case, the difference between the arrival moment of the first data packet and the encoding start moment is largest. On the contrary, the PDB that is from the core network device to the terminal device and that is determined based on the transmission delay of the last data packet from the server to the core network device is smallest. Therefore, the PDB that is from the core network device to the terminal device and that is determined by using the last data packet can be considered as a frame-level PDB.

Optionally, based on the embodiment shown in FIG. 11, the method further includes: The server sends a second data packet. The second data packet is any data packet other than the first data packet in the first data frame. Correspondingly, the core network device receives the second data packet. A PDB of the second data packet from the core network device to the terminal device is equal to the PDB of the first data packet from the core network device to the terminal device.

It should be understood that, in this embodiment, the first data packet is the last data packet in the first data frame, that is, the first data packet is the data packet that last arrives at the core network device. Therefore, when the first data packet arrives at the core network device, it means that any data packet (such as the second data packet) before the first data packet also already arrives at the core network device.

Therefore, the calculated PDB of the first data packet is used as the PDB of the second data packet. This can further ensure a transmission delay of the second data packet.

In an optional embodiment, in a possible implementation, the first information that indicates the encoding start moment and that is sent by the server to the core network device is carried in a packet header of the first data packet. The first data packet is any data packet in the first data frame.

With reference to FIG. 12, the following describes in detail the delay budget determining method provided in embodiments when the first information is carried in the packet header of the first data packet and the first data packet is the any data packet in the first data frame. In FIG. 12, an example in which a core network device and a server are used as execution bodies of the interaction example is used to illustrate the method. However, the execution bodies of the interaction example are not limited. For example, the core network device in FIG. 12 may alternatively be a chip, a chip system, or a processor that supports the core network device in implementing the method, or may be a logical module or software that can implement all or some of functions of the core network device. The server in FIG. 12 may alternatively be a chip, a chip system, or a processor that supports the server in implementing the method, or may be a logical module or software that can implement all or some of functions of the server.

FIG. 12 is a schematic flowchart of a delay budget determining method according to still another embodiment. As shown in FIG. 12, the method in this embodiment may include S1201, S1202, S1203, S1204, and S1205. The delay budget determining method may be performed by the core network device in the communication system shown in FIG. 1.

S1201: The core network device obtains an E2E PDB, where the E2E PDB is a PDB of the first data packet from the server to a terminal device.

For detailed descriptions of this step, refer to the descriptions of S1101 in the embodiment shown in FIG. 11. Details are not described herein again.

S1202: The server generates first information, where the first information is carried in a packet header of the first data packet, the first information indicates an encoding start moment that is in the server and that is of a first data frame to which the first data packet belongs, and the first data packet is any one of at least two data packets corresponding to the first data frame.

For detailed descriptions of this step, refer to the descriptions of S802 in the embodiment shown in FIG. 8.

S1203: The server sends the first data packet to the core network device. Correspondingly, the core network device receives the first data packet.

It may be understood that, in this embodiment, because the first information is carried in the first data packet, sending the first data packet to the core network device by the server includes sending the first information to the core network device.

S1204: The core network device determines that a transmission delay of the first data packet from the server to the core network device is a difference between a moment at which the first data packet arrives at the core network device and the encoding start moment.

In this embodiment, when receiving the first data packet, the core network device can obtain the first information in the first data packet, such as the encoding start moment of the first data frame to which the first data packet belongs. In this case, when the first data packet arrives at the core network device, the core network device can calculate the difference between the moment at which the first data packet arrives at the core network device and the encoding start moment carried in the first data packet, and then determine the difference as the transmission delay of the first data packet from the server to the core network device.

S1205: The core network device determines that a PDB of the first data packet from the core network device to the terminal device is a difference between the E2E PDB and the transmission delay.

For detailed descriptions of this step, refer to the descriptions of S903 in the embodiment shown in FIG. 9. Details are not described herein again.

It should be noted herein that a difference between the delay budget determining method provided in this embodiment and the delay budget determining method provided in FIG. 11 is as follows: The first data packet in this embodiment is the any data packet, that is, the server in this embodiment adds a timestamp label to the any data packet in the first data frame. Therefore, a time consumed when the any data packet is transmitted from the server to the core network device can be determined by using a moment at which the data packet arrives at the core network device. In other words, a data packet—level delay budget is completed in the method in this embodiment. In addition, a difference between the delay budget determining method provided in this embodiment and the delay budget determining method provided in FIG. 8 is that, in this embodiment, the core network device is used as the execution body, but in the embodiment 8, the access network device is used as the execution body.

In conclusion, regardless of a specific form (for example, the access network device, the core network device, the component of the communication device, or the logical module or software that can implement all or some of the functions of the communication device) of the communication device, when the communication device determines a delay budget, as shown in FIG. 13, the delay budget determining method includes the following steps.

S1301: Receive a first data packet and first information, where the first information indicates an encoding start moment that is in a server and that is of a first data frame to which a first data packet belongs, the first data frame corresponds to at least two data packets, and the first information is carried in one or more of the at least two data packets.

S1302: Determine a transmission delay of the first data packet from the server to the communication device based on a moment at which the first data packet arrives at the communication device and the encoding start moment.

S1303: Determine a PDB of the first data packet from the communication device to a terminal device based on the transmission delay and an E2E PDB, where the E2E PDB is a PDB of the first data packet from the server to the terminal device.

The embodiment shown in FIG. 13 is not described herein. For details, refer to the descriptions in FIG. 3 to FIG. 12.

With reference to FIG. 3 to FIG. 13, the foregoing describes the delay budget determining method performed by the access network device or the core network device in a unidirectional scenario (such as a scenario in which the server actively sends a data frame to the terminal device).

With reference to the accompanying drawings, the following describes a delay budget determining method performed by a communication device (for example, an access network device or a core network device) in a closed-loop scenario (that is, a data frame sent by a server to a terminal device is sent based on a request of the terminal device).

For ease of distinguishing from the first data frame in the unidirectional scenario, the data frame in the closed-loop scenario is referred to as a second data frame Similar to the first data frame, the second data frame also corresponds to at least two data packets.

Figure 14:
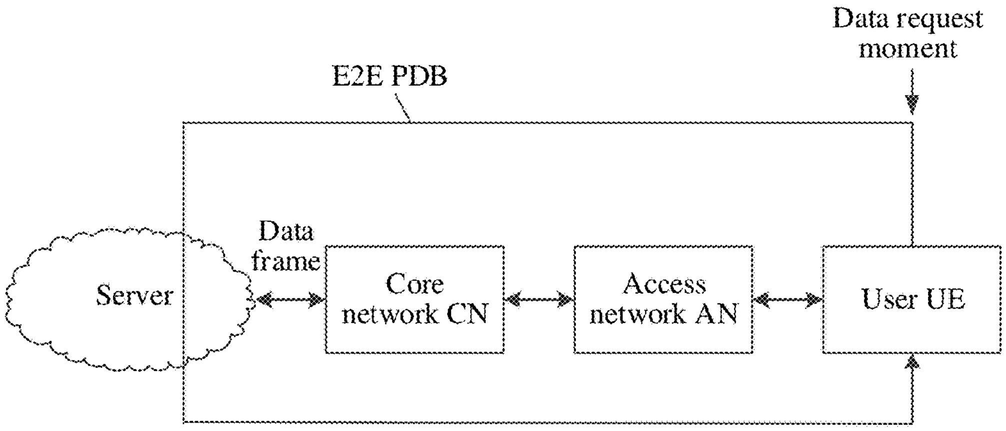
FIG. 14 is a diagram of a structure of composition of a delay budget according to an embodiment.

For example, FIG. 14 is a diagram of a structure of an E2E PDB in a closed-loop scenario according to an embodiment. As shown in FIG. 14, a solid line in FIG. 14 represents the E2E PDB in the closed-loop scenario, which is a PDB from requesting the second data frame by a terminal device to receiving the second data frame by the terminal device.

Figure 15:
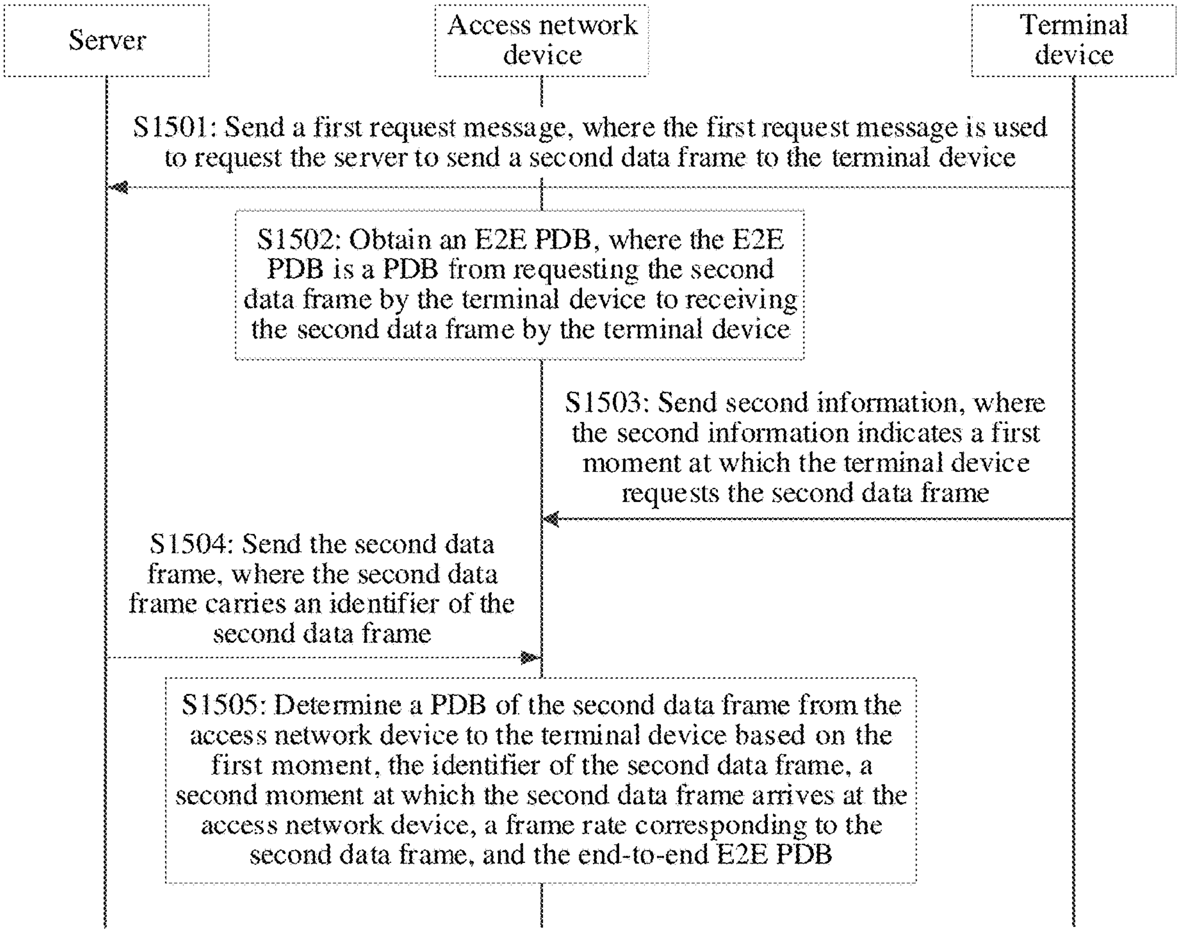
FIG. 15 is a schematic flowchart of a delay budget determining method according to an embodiment.

First, a delay budget determining method performed by an access network device in this scenario is described. As shown in FIG. 15, the method in this embodiment may include S1501, S1502, S1503, S1504, and S1505. The delay budget determining method may be performed by the access network device 102 in the communication system shown in FIG. 1. In FIG. 15, an example in which the terminal device, the access network device, and a server are used as execution bodies of the interaction example is used to illustrate the method. However, the execution bodies of the interaction example are not limited. For example, the terminal device in FIG. 15 may alternatively be a chip, a chip system, or a processor that supports the terminal device in implementing the method, or may be a logical module or software that can implement all or some of functions of the terminal device. The access network device in FIG. 15 may alternatively be a chip, a chip system, or a processor that supports the access network device in implementing the method, or may be a logical module or software that can implement all or some of functions of the access network device. The server in FIG. 15 may alternatively be a chip, a chip system, or a processor that supports the server in implementing the method, or may be a logical module or software that can implement all or some of functions of the server.

S1501: The terminal device initiates a first request message to the server, where the first request message is used to request the server to send the second data frame to the terminal device.

In other words, in this embodiment, a prerequisite for the server to send the second data frame to the terminal device is that the terminal device sends the first request message to the server.

S1502: The access network device obtains an E2E PDB, where the E2E PDB is a PDB from requesting the second data frame by the terminal device to receiving the second data frame by the terminal device.

For how the access network device obtains the E2E PDB, refer to the descriptions of S501 in the embodiment shown in FIG. 5. Details are not described herein again.

It should be noted herein that a difference between the E2E PDB in this embodiment and the E2E PDB in the embodiment shown in FIG. 5 is that the E2E PDB in this embodiment indicates a time from initiating the request for the second data frame by the terminal device to receiving the second data frame by the terminal device, but the E2E PDB in the embodiment shown in FIG. 5 indicates a time from starting to encode the first data frame by the server to arrival of the first data frame at the terminal device.

S1503: The terminal device sends second information to the access network device. Correspondingly, the access network device receives the second information. The second information indicates a first moment at which the terminal device requests the second data frame.

In a possible implementation, the terminal device may include the second information in signaling. Correspondingly, the access network device receives the signaling to obtain the first moment at which the terminal device requests the second data frame from the server.

For example, the signaling may be radio resource control (radio resource control, RRC), a media access control control element (MAC CE), or uplink control information (UCI). This is not limited.

For example, when the signaling carrying the first information is RRC, a field "ServiceRequestTime" may be added to a "UEAssistancelnformation" message in RRC, to indicate a user data request moment.

S1504: The server sends the second data frame to the access network device. Correspondingly, the access network device receives the second data frame. The second data frame carries an identifier of the second data frame.

It may be understood that the server may send a plurality of data frames to the terminal device, and each data frame corresponds to at least two data packets. Therefore, the server may perform frame identification on the at least two data packets corresponding to each generated data frame. In this way, data packets belonging to a same frame have a same frame identifier. In this way, the access network device may detect, based on the frame identifier, a data frame to which each data packet belongs.

S1505: The access network device determines a PDB of the second data frame from the access network device to the terminal device based on the first moment, the identifier of the second data frame, a second moment at which the second data frame arrives at the access network device, a frame rate corresponding to the second data frame, and the E2E PDB.

It may be understood that the second data frame includes a plurality of data packets, and it can be ensured that the second data frame arrives at the access network device only when a last data packet in the second data frame also arrives at the access network device. Therefore, in this embodiment, the second moment at which the second data frame arrives at the access network device may be considered as an arrival moment of the last data packet in the second data frame.

In a possible implementation, the access network device may perform frame identifier detection on the plurality of received data packets, and then use, as the arrival moment of the second data frame, an arrival moment of a last data packet belonging to a same frame identifier.

It should be noted herein that a manner in which the access network device obtains the frame rate is not limited in embodiments. For example, the frame rate may be pre-configured in the access network device, or the server may notify the core network device of the frame rate through an N6 interface, and then the core network device notifies the access network device of the frame rate through an N3 interface.

Figure 16:
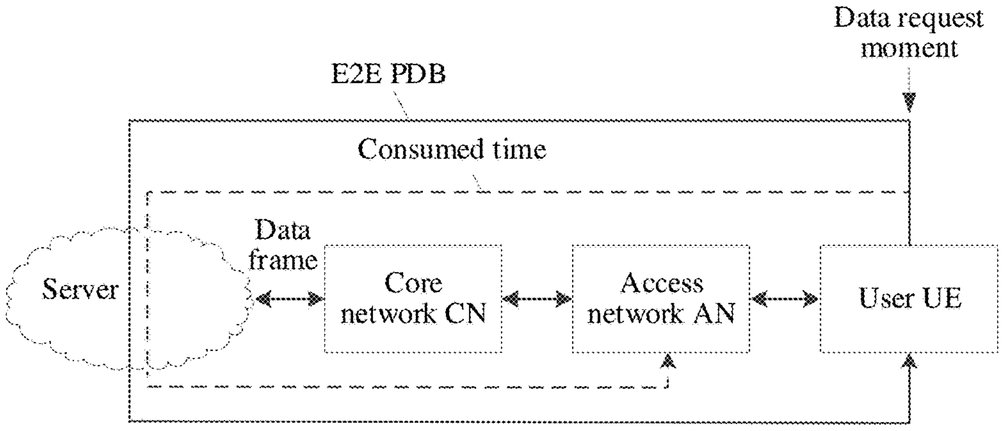
FIG. 16 is a diagram of a structure of a delay budget determining method according to an embodiment.

In a possible implementation, to determine the PDB of the second data frame from the access network device to the terminal device, the access network device may first determine the consumed time from initiating the request for the second data frame by the terminal device to arrival of the second data frame at the access network device. As shown in FIG. 16, after the consumed time is calculated, a PDB occurring when a data frame is transmitted from the access network device to the terminal device may be determined by using a difference between an E2E PDB and the consumed time.

In a possible implementation, the consumed time from initiating the request for the second data frame by the terminal device to arrival of the second data frame at the access network device may be calculated by using the first moment, the identifier of the second data frame, the second moment, and the frame rate corresponding to the second data frame.

For example, the first moment, the identifier of the second data frame, the second moment, and the frame rate corresponding to the second data frame satisfy the following relational expression:

$$T_n = T_{arrive(n)} - \left(T_{start} + \frac{n-1}{fps}\right)$$

$T_{arrive(n)}$ indicates the second moment, $T_{start}$ indicates the first moment, fps indicates the frame rate corresponding to the second data frame, n indicates the identifier of the second data frame, and $T_n$ indicates a transmission delay occurring when the second data frame arrives at the communication device.

For ease of understanding, Table 3 shows an example of the delay budget determining method. In this example, a user initiates a data request at $T_{start}$=0 s (s) 0 ms (ms), and a cycle in which the server generates a data frame is $$\frac{1}{fps} = 16.67 \text{ ms.}$$

TABLE 3

Example of the delay budget determining method

| | Local clock | $T_{start} + \frac{n-1}{fps}$ | Consumed time |
|---|---|---|---|
| $1^{st}$ frame | $T_{arrive(1)}$ = 00 s 60.00 ms | 00 s 00.00 ms | $T_{(1)}$ = 60.00 ms |
| $2^{nd}$ frame | $T_{arrive(2)}$ = 00 s 77.67 ms | 00 s 16.67 ms | $T_{(2)}$ = 61.00 ms |
| $3^{rd}$ frame | $T_{arrive(3)}$ = 00 s 92.34 ms | 00 s 33.34 ms | $T_{(3)}$ = 59.00 ms |
| $4^{th}$ frame | $T_{arrive(4)}$ = 00 s 110.01 ms | 00 s 50.01 ms | $T_{(4)}$ = 60.00 ms |

In this example, it is assumed that the terminal device initiates, at $T_{start}$, that is 0 s 0 ms (ms), a data request for requesting an XR video service, and a quantity of frames transmitted per second of the XR video service is 60 Hz, that is, the server generates one video frame at an interval of the cycle that is $$\frac{1}{fps} = 16.67 \text{ ms.}$$

After receiving the request message, the server generates the video frame and delivers the video frame to a network for transmission.

If a moment at which the lst frame arrives at the access network device is $$T_{arrive(1)} = 00s60.00 \text{ ms}, T_{start} + \frac{n-1}{fps}$$

is equal to 0 ms. In this case, a consumed time of the frame is a $$T_{arrive(1)} = 00s60.00 \text{ ms and } T_{start} + \frac{n-1}{fps},$$

difference between such as 60 ms.

If a moment at which the $2^{nd}$ frame arrives at the access network device is $$T_{arrive(2)} = 00s77.67 \text{ ms}, T_{start} + \frac{n-1}{fps}$$

is equal to 00 s16.67 ms. In this case, a consumed time of the frame is a difference between $$T_{arrive(2)} = 00s77.67 \text{ ms and } T_{start} + \frac{n-1}{fps},$$

such as 61 ms.

If a moment at which the $3^{rd}$ frame arrives at the access network device is $$T_{arrive(3)} = 00s92.34 \text{ ms}, T_{start} + \frac{n-1}{fps}$$

is equal to 00 s33.34 ms. In this case, a consumed time of the frame is a difference between $$T_{arrive(3)} = 00s92.34 \text{ ms and } T_{start} + \frac{n-1}{fps},$$

such as 59 ms.

If a moment at which the $4^{th}$ frame arrives at the access network device is $$T_{arrive(4)} = 00s110.01 \text{ ms, } T_{start} + \frac{n-1}{fps}$$

is equal to 00 s50.01 ms. In this case, a consumed time of the frame is a difference between $$T_{arrive(4)} = 00s110.01 \text{ ms and } T_{start} + \frac{n-1}{fps},$$

such as 60 ms.

In this case, if a specified E2E PDB is 70 ms, the access network device may determine that a PDB of the lst frame from the access network device to the terminal device is 10 ms, a PDB of the $2^{nd}$ frame from the access network device to the terminal device is 9 ms, a PDB of the $3^{rd}$ frame from the access network device to the terminal device is 11 ms, and a PDB of the $4^{th}$ frame from the access network device to the terminal device is 10 ms.

According to the delay budget determining method provided in embodiments, the consumed time of the second data frame from initiating the request for the second data frame by the terminal device to arrival of the second data frame at the access network device is determined, and then a remaining air interface delay budget is obtained based on an E2E delay requirement in the closed-loop scenario. In this way, the access network device can adjust a corresponding scheduling priority based on the air interface delay budget, to meet the E2E delay requirement as much as possible.

Figure 17:
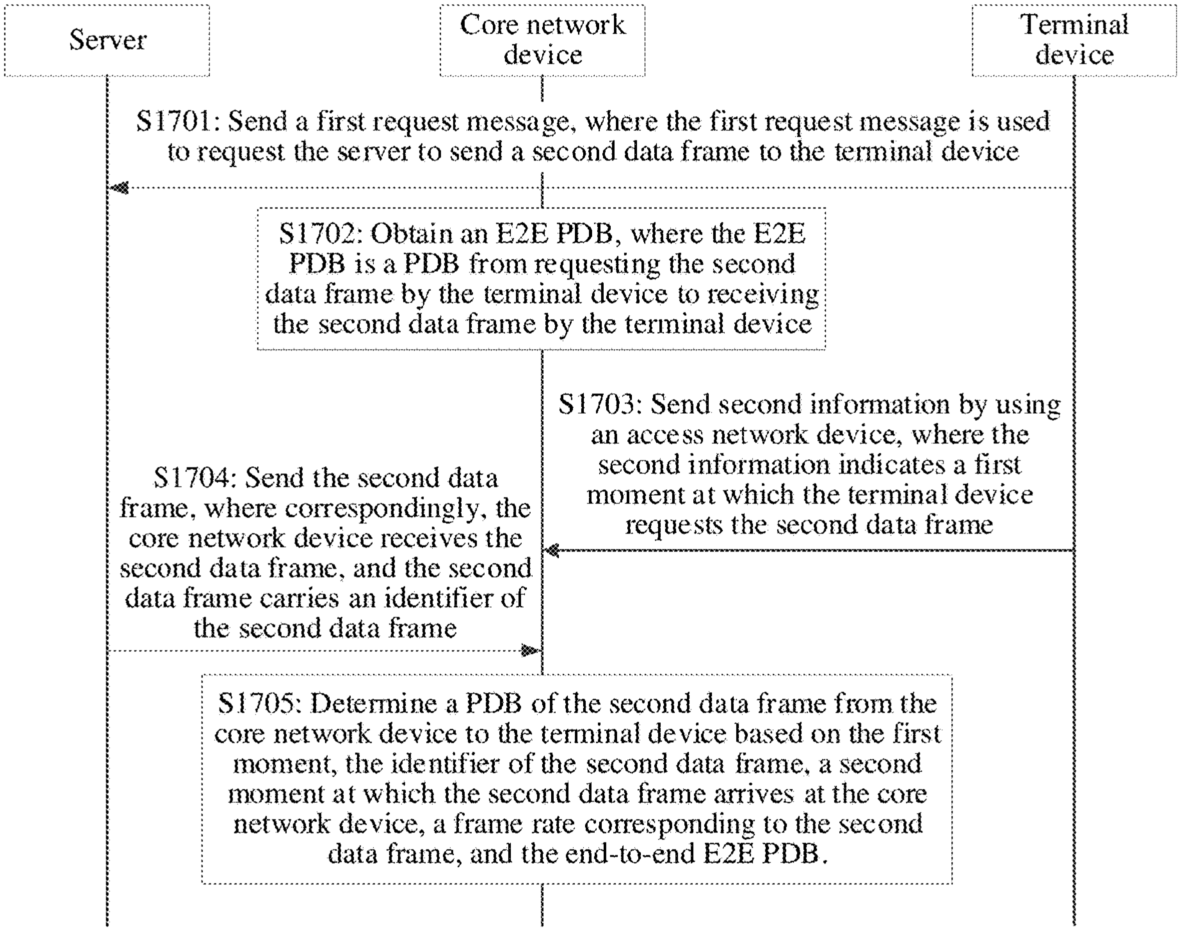
FIG. 17 is a schematic flowchart of a delay budget determining method according to an embodiment.

The following continues to describe a delay budget determining method performed by a core network device in the closed-loop E2E scenario. As shown in FIG. 17, the method in this embodiment may include S1701, S1702, S1703, S1704, and S1705. The delay budget determining method may be performed by the core network device in the communication system shown in FIG. 1. In FIG. 17, an example in which a terminal device, the core network device, and a server are used as execution bodies of the interaction example is used to illustrate the method. However, the execution bodies of the interaction example are not limited. For example, the terminal device in FIG. 17 may alternatively be a chip, a chip system, or a processor that supports the terminal device in implementing the method, or may be a logical module or software that can implement all or some of functions of the terminal device. The core network device in FIG. 17 may alternatively be a chip, a chip system, or a processor that supports the core network device in implementing the method, or may be a logical module or software that can implement all or some of functions of the core network device. The server in FIG. 17 may alternatively be a chip, a chip system, or a processor that supports the server in implementing the method, or may be a logical module or software that can implement all or some of functions of the server.

S1701: The terminal device sends a first request message to the server, where the first request message is used to request the server to send a second data frame to the terminal device.

For detailed descriptions of this step, refer to S1501 in the embodiment shown in FIG. 15. Details are not described herein again.

S1702: The core network device obtains an E2E PDB, where the E2E PDB is a PDB from requesting the second data frame by the terminal device to receiving the second data frame by the terminal device.

A concept of the E2E PDB in this embodiment is the same as the concept of the E2E PDB in the embodiment shown in FIG. 15. For detailed descriptions, refer to the descriptions in the embodiment shown in FIG. 15. Details are not described herein again.

In a possible implementation, the E2E PDB may be preconfigured in the core network device.

For another example, in another possible implementation, the server may send the E2E PDB to the core network device.

S1703: The terminal device sends second information to the core network device by using the access network device. Correspondingly, the core network device receives the second information. The second information indicates a first moment at which the terminal device requests the second data frame.

For example, the terminal device may include the second information in signaling. Correspondingly, the access network receives the signaling and transmits the signaling to the core network device. In this way, the core network obtains the second information by parsing the signaling.

S1704: The server sends the second data frame to the core network device. Correspondingly, the core network device receives the second data frame. The second data frame carries an identifier of the second data frame.

For detailed descriptions of this step, refer to the description of S1504 in the embodiment shown in FIG. 15. A difference between S1704 in this embodiment and S1504 in the embodiment shown in FIG. 15 lies only in that the second data frame is received by different main bodies.

S1705: The core network device determines a PDB of the second data frame from the core network device to the terminal device based on the first moment, the identifier of the second data frame, a second moment at which the second data frame arrives at the core network device, a frame rate corresponding to the second data frame, and the E2E PDB.

For a detailed implementation process in this embodiment, refer to S1505 shown in FIG. 15. A difference between this embodiment and S1505 in the embodiment shown in FIG. 15 lies only in that the second moment is a moment at which the second data frame arrives at the core network device, but not a moment at which the second data frame arrives at the access network device.

It should be noted herein that a manner in which the core network device obtains the frame rate is not limited in embodiments. For example, the frame rate may be preconfigured in the core network device, or the server may notify the core network device of a quantity of frames transmitted per second of the first service through an N6 interface.

Figure 18:
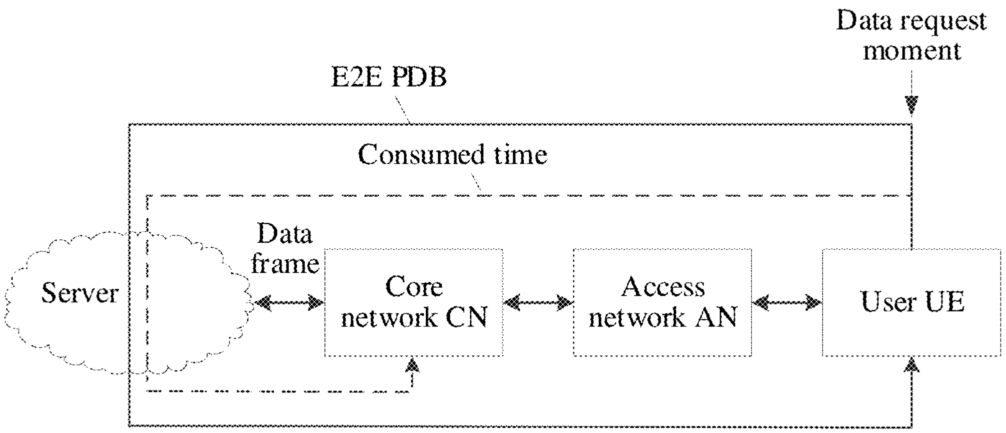
FIG. 18 is a diagram of a structure of a delay budget determining method according to an embodiment.

In a possible implementation, to determine the PDB of the second data frame from the core network device to the terminal device, the core network device may first determine the consumed time from initiating the request for the second data frame by the terminal device to arrival of the second data frame at the core network device. As shown in FIG. 18, after the consumed time is calculated, a PDB occurring when a data frame is transmitted from the core network device to the terminal device may be determined by using a difference between an E2E PDB and the consumed time.

Optionally, after the core network device determines the PDB of the second data frame from the core network device to the terminal device, the method further includes: the core network device sends, to the access network device, the PDB of the second data frame from the core network device to the terminal device. The access network device determines a PDB of the second data frame from the access network device to the terminal device based on the PDB of the data frame from the core network device to the terminal device and a PDB of the data frame from the core network device to the access network device. For detailed descriptions of this part, refer to the descriptions in the foregoing embodiments or descriptions in the conventional technology. Details are not described herein again.

According to the delay budget determining method provided in embodiments, the consumed time of the second data frame from initiating the request for the second data frame by the terminal device to arrival of the second data frame at the core network device is determined, and then a transmission delay budget from the core network device to the terminal device is obtained based on an E2E delay requirement in the closed-loop scenario. This meets the E2E delay requirement as much as possible.

Figure 19:
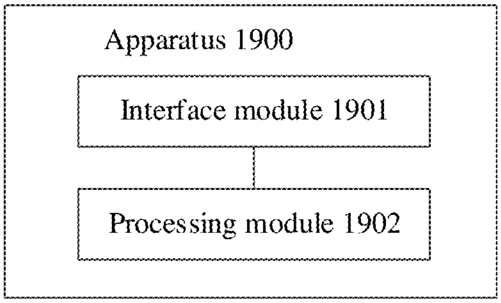
FIG. 19 is a diagram of a structure of a delay budget determining apparatus according to an embodiment.

FIG. 19 is a diagram of a structure of a delay budget determining apparatus according to an embodiment. The apparatus 1900 may be a communication device, may be a component (for example, a processor, a chip, or a chip system) of a communication device, or may be a logical module or software that can implement all or some of functions of a communication device. The apparatus 1900 includes an interface module 1901 and a processing module 1902.

In an embodiment, the interface module 1901 is configured to receive a first data packet and first information. The first information indicates an encoding start moment that is in a server and that is of a first data frame to which the first data packet belongs. The first data frame corresponds to at least two data packets. The first data packet is a last data packet in the at least two data packets. The first information is carried in one or more of the at least two data packets. The processing module 1902 is configured to determine a PDB of the first data packet from the communication device to a terminal device based on a moment at which the first data packet arrives at the communication device and the encoding start moment.

In an example, the interface module 1901 may be configured to perform the step of receiving the first data packet and the first information in the method in FIG. 5. For example, the interface module 1901 is configured to perform S501.

In a possible implementation, the first information is carried in a packet header of one of the at least two data packets.

In a possible implementation, the processing module 1902 is configured to: determine a transmission delay of the first data packet from the server to the communication device based on the moment at which the first data packet arrives at the communication device and the encoding start moment; and determine the PDB of the first data packet from the communication device to the terminal device based on the transmission delay and an E2E PDB, where the E2E PDB is a PDB of the first data packet from the server to the terminal device.

In a possible implementation, the transmission delay of the first data packet from the server to the communication device is a difference between the moment at which the first data packet arrives at the communication device and the encoding start moment. The PDB of the first data packet from the communication device to the terminal device is a difference between the E2E PDB and the transmission delay.

In a possible implementation, the interface module 1901 is further configured to receive a second data packet. The second data packet is any data packet other than the first data packet in the at least two data packets. A PDB of the second data packet from the communication device to the terminal device is equal to the PDB of the first data packet from the communication device to the terminal device.

In a possible implementation, a packet header of the first data packet and a packet header of the second data packet carry a same frame identifier. The frame identifier indicates the first data frame.

In a possible implementation, the communication device is an access network device or a core network device.

In another embodiment, the interface module 1901 is configured to receive second information. The second information indicates a first moment at which a terminal device requests a second data frame. The processing module 1902 is configured to determine a PDB of the second data frame from the communication device to the terminal device based on the first moment, an identifier of the second data frame, a second moment at which the second data frame arrives at the communication device, and a frame rate corresponding to the second data frame.

In an example, the interface module 1901 may be configured to perform the step of receiving second information in the methods in FIG. 15 to FIG. 17. For example, the interface module 1901 is configured to perform S1503.

In a possible implementation, the PDB of the second data frame from the communication device to the terminal device is further related to an E2E PDB. The E2E PDB is a PDB from requesting the second data frame by the terminal device to receiving the second data frame by the terminal device.

In a possible implementation, the first moment, the identifier of the second data frame, the second moment, and the frame rate corresponding to the second data frame satisfy the following relational expression:

$$T_n = T_{arrive(n)} - \left(T_{start} + \frac{n-1}{fps}\right)$$

$T_{arrive(n)}$ indicates the second moment, $T_{start}$ indicates the first moment, fps indicates the frame rate corresponding to the second data frame, n indicates the identifier of the second data frame, and $T_n$ indicates a transmission delay occurring when the second data frame arrives at the communication device.

In a possible implementation, the communication device is an access network device or a core network device.

In still another embodiment, the interface module 1901 is configured to receive a first data packet and first information. The first information indicates an encoding start moment that is in a server and that is of a first data frame to which the first data packet belongs. The first information is carried in a packet header of the first data packet, the first data frame corresponds to at least two data packets. The first data packet is any data packet in the at least two data packets. The processing module 1902 is configured to determine a PDB of the first data packet from the communication device to a terminal device based on a moment at which the first data packet arrives at the communication device and the encoding start moment.

In an example, the interface module 1901 may be configured to perform the step of receiving the first data packet in the method in FIG. 8. For example, the interface module 1901 is configured to perform S803.

In a possible implementation, the processing module 1902 is configured to: determine a transmission delay of the first data packet from the server to the communication device based on a moment at which the first data packet arrives at the communication device and an encoding start moment; and determine a PDB of the first data packet from the communication device to the terminal device based on the transmission delay and an E2E PDB, where the E2E PDB is the PDB of the first data packet from the server to the terminal device.

Figure 20:
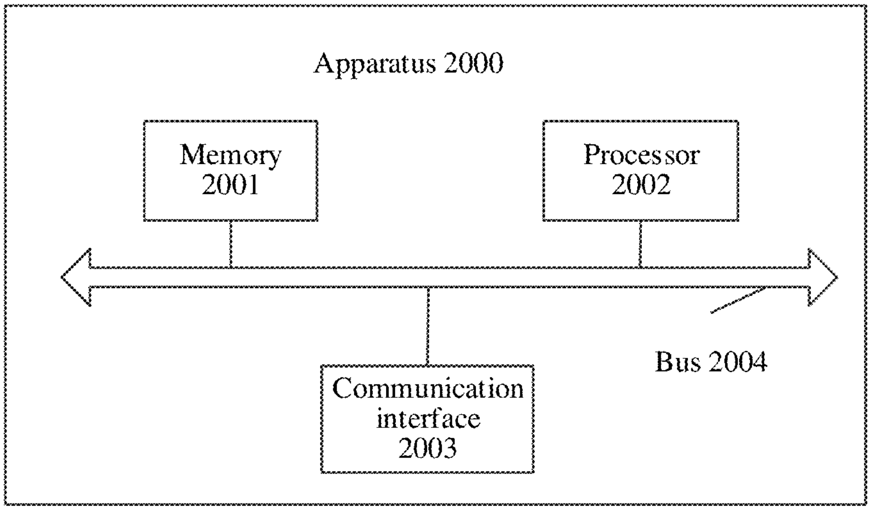
FIG. 20 is a diagram of a structure of a delay budget determining apparatus according to another embodiment.

FIG. 20 is a diagram of a structure of a delay budget determining apparatus according to another embodiment. The apparatus shown in FIG. 20 may be configured to perform the method according to any one of the foregoing embodiments.

As shown in FIG. 20, the apparatus 2000 in this embodiment includes a memory 2001, a processor 2002, a communication interface 2003, and a bus 2004. The memory 2001, the processor 2002, and the communication interface 2003 are communicatively connected to each other through the bus 2004.

The memory 2001 may be a read-only memory (ROM), a static storage device, a dynamic storage device, or a random access memory (RAM). The memory 2001 may store a program. When the program stored in the memory 2001 is executed by the processor 2002, the processor 2002 is configured to perform the steps of the methods shown in FIG. 3 to FIG. 17.

The processor 2002 may be a general-purpose central processing unit (CPU), a microprocessor, an application-specific integrated circuit (ASIC), or one or more integrated circuits, and is configured to execute a related program, to implement the methods shown in FIG. 3 to FIG. 17 in the embodiments.

The processor 2002 may be an integrated circuit chip, and has a signal processing capability. In an implementation process, the steps of the methods in FIG. 3 to FIG. 17 in embodiments may be completed by an integrated logic circuit of hardware in the processor 2002 or by using instructions in a form of software.

The processor 2002 may alternatively be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor 2002 may implement or perform the methods, the steps, and logical block diagrams that are in embodiments. The general-purpose processor may be a microprocessor, or the processor may be any conventional processor or the like.

The steps of the methods with reference to embodiments may be directly performed and accomplished by a hardware decoding processor, or may be performed and accomplished by using a combination of hardware in a decoding processor and a software module. A software module may be located in a mature storage medium in the art, for example, a random access memory, a flash memory, a read-only memory, a programmable read-only memory, an electrically erasable programmable memory, or a register. The storage medium is located in the memory 2001. The processor 2002 reads information in the memory 2001, and completes, in combination with hardware of the processor 2002, functions that need to be performed by units included in the apparatus in the embodiments. For example, the processor 2002 may perform steps/functions in the embodiments shown in FIG. 3 to FIG. 17.

The communication interface 2003 may be but is not limited to a transceiver apparatus like a transceiver, to implement communication between the apparatus 2000 and another device or a communication network.

The bus 2004 may include a path for transmitting information between components (for example, the memory 2001, the processor 2002, and the communication interface 2003) of the apparatus 2000.

It should be understood that the apparatus 2000 shown in this embodiment may be an electronic device, or may be a chip configured in an electronic device.

All or some of the foregoing embodiments may be implemented by using software, hardware, firmware, or any combination thereof. When software is used to implement the foregoing embodiments, all or some of the foregoing embodiments may be implemented in a form of a computer program product. The computer program product includes one or more computer instructions or computer programs. When the computer instruction or the computer program is loaded or executed on a computer, the procedure or functions according to embodiments are completely or partially generated. The computer may be a general-purpose computer, a dedicated computer, a computer network, or another programmable apparatus. The computer instruction may be stored in a non-transitory computer-readable storage medium or may be transmitted from a non-transitory computer-readable storage medium to another non-transitory computer-readable storage medium. For example, the computer instruction may be transmitted from a website, computer, server, or data center to another website, computer, server, or data center in a wired (for example, infrared, radio, or microwave) manner. The non-transitory computer-readable storage medium may be any usable medium accessible by a computer, or a data storage device like a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

It should be understood that the term "and/or" describes only an association relationship between associated objects and indicates that three relationships may exist. For example, A and/or B may indicate the following three cases: only A exists, both A and B exist, and only B exists, where A and B may be singular or plural. In addition, the character "I" generally indicates an "or" relationship between associated objects, but may also indicate an "and/or" relationship. For details, refer to the context for understanding.

In the embodiments, "at least one" means one or more, and "a plurality" of means two or more. "At least one of the following items (pieces)" or a similar expression thereof means any combination of these items, including any combination of singular items (pieces) or plural items (pieces). For example, at least one of a, b, or c may indicate a, b, c, a and b, a and c, b and c, or a, b, and c, where a, b, and c may be singular or plural.

It should be understood that, in embodiments, sequence numbers of the foregoing processes do not mean execution sequences. The execution sequences of the processes should be determined based on functions and internal logic of the processes, and should not be construed as any limitation on the implementation processes of embodiments.

A person of ordinary skill in the art may be aware that units and algorithm steps in the examples described with reference to embodiments may be implemented by using electronic hardware or a combination of computer software and electronic hardware. Whether these functions are performed in a form of hardware or software depends on particular applications and design constraint conditions of the solutions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided, it should be understood that the system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or the communication connections between the apparatuses or the units may be implemented in electrical, mechanical, or other forms.

The units described as separate parts may or may not be physically separate, and the parts displayed as units may or may not be physical units, may be located in one position, or may be distributed on a plurality of network elements. Some or all of the units may be selected based on an actual requirement, to achieve the objectives of the solutions of embodiments.

In addition, functional units in embodiments may be integrated into one processing unit, each of the units may exist alone physically, or two or more units may be integrated into one unit.

When being implemented in a form of a software functional unit and sold or used as an independent product, the functions may be stored in a non-transitory computer-readable storage medium. Based on such an understanding, the solutions of the embodiments essentially, or the part with contributions, or some of the solutions may be implemented in a form of a software product. The computer software product is stored in a storage medium, and includes several instructions for instructing a computer device (which may be a personal computer, a server, or a network device) to perform all or some of the steps of the methods described in embodiments. The foregoing storage medium includes any medium that can store program code, for example, a USB flash disk, a removable hard disk, a read-only memory, a random access memory, a magnetic disk, or an optical disc.

The foregoing descriptions are merely specific implementations of the embodiments, but are not limiting. Any variation or replacement readily figured out by a person skilled in the art shall fall within the scope of the embodiments.

What is claimed is:

1. A method, applied to a communication device, the method comprising:

receiving a first data packet and first information, wherein the first information indicates an encoding start moment that is in a server and that is of a first data frame to which the first data packet belongs, the first data frame corresponds to at least two data packets, the first data packet is a last data packet in the at least two data packets, and the first information is carried in one or more of the at least two data packets; and determining a packet delay budget (PDB) of the first data packet from the communication device to a terminal device based on a moment at which the first data packet arrives at the communication device and the encoding start moment.

2. The method according to claim 1, wherein the first information is carried in a packet header of one of the at least two data packets.

3. The method according to claim 1, wherein determining the PDB of the first data packet from the communication device to the terminal device based on the moment at which the first data packet arrives at the communication device and the encoding start moment comprises:

determining a transmission delay of the first data packet from the server to the communication device based on the moment at which the first data packet arrives at the communication device and the encoding start moment; and determining the PDB of the first data packet from the communication device to the terminal device based on the transmission delay and an end-to-end (E2E) PDB, wherein the E2E PDB is a PDB of the first data packet from the server to the terminal device.

4. The method according to claim 3, wherein the transmission delay of the first data packet from the server to the communication device is a difference between the moment at which the first data packet arrives at the communication device and the encoding start moment; and the PDB of the first data packet from the communication device to the terminal device is a difference between the E2E PDB and the transmission delay.

5. The method according to claim 1, further comprising:

receiving a second data packet, wherein the second data packet is any data packet other than the first data packet in the at least two data packets, and a PDB of the second data packet from the communication device to the terminal device is equal to the PDB of the first data packet from the communication device to the terminal device.

6. The method according to claim 5, wherein a packet header of the first data packet and a packet header of the second data packet carry a same frame identifier, and the frame identifier indicates the first data frame.

7. The method according to claim 1, wherein the communication device is an access network device or a core network device.

8. An apparatus, comprising:

one or more processors to execute instructions causing the apparatus to:

receive a first data packet and first information, wherein the first information indicates an encoding start moment that is in a server and that is of a first data frame to which the first data packet belongs, the first data frame corresponds to at least two data packets, the first data packet is a last data packet in the at least two data packets, and the first information is carried in one or more of the at least two data packets; and determine a packet delay budget (PDB) of the first data packet from the communication device to a terminal device based on a moment at which the first data packet arrives at the communication device and the encoding start moment.

9. The apparatus according to claim 8, wherein the first information is carried in a packet header of one of the at least two data packets.

10. The apparatus according to claim 8, wherein the apparatus is caused to determine a PDB of the first data packet from the communication device to a terminal device based on a moment at which the first data packet arrives at the communication device and the encoding start moment, comprising:

the one or more processors to execute instructions causing the apparatus to:

determine a transmission delay of the first data packet from the server to the communication device based on the moment at which the first data packet arrives at the communication device and the encoding start moment; and determine the PDB of the first data packet from the communication device to the terminal device based on the transmission delay and an end-to-end (E2E) PDB, wherein the E2E PDB is a PDB of the first data packet from the server to the terminal device.

11. The apparatus according to claim 10, wherein the transmission delay of the first data packet from the server to the communication device is a difference between the moment at which the first data packet arrives at the communication device and the encoding start moment; and the PDB of the first data packet from the communication device to the terminal device is a difference between the E2E PDB and the transmission delay.

12. The apparatus according to claim 8, wherein the apparatus is further caused to receive a second data packet, wherein the second data packet is any data packet other than the first data packet in the at least two data packets, and a PDB of the second data packet from the communication device to the terminal device is equal to the PDB of the first data packet from the communication device to the terminal device.

13. The apparatus according to claim 12, wherein a packet header of the first data packet and a packet header of the second data packet carry a same frame identifier, and the frame identifier indicates the first data frame.

14. The apparatus according to claim 8, wherein the apparatus is an access network device or a core network device.

15. A non-transitory computer readable medium storing instructions that are executable by a computer, the non-transitory computer readable medium is applied to a first communication apparatus, and the instructions comprise instructions for:

receiving a first data packet and first information, wherein the first information indicates an encoding start moment that is in a server and that is of a first data frame to which the first data packet belongs, the first data frame corresponds to at least two data packets, the first data packet is a last data packet in the at least two data packets, and the first information is carried in one or more of the at least two data packets; and determining a packet delay budget (PDB) of the first data packet from the communication device to a terminal device based on a moment at which the first data packet arrives at the communication device and the encoding start moment.

16. The non-transitory computer readable medium according to claim 15, wherein the first information is carried in a packet header of one of the at least two data packets.

17. The non-transitory computer readable medium according to claim 15, wherein determining the PDB of the first data packet from the communication device to the terminal device based on the moment at which the first data packet arrives at the communication device and the encoding start moment comprises:

determining a transmission delay of the first data packet from the server to the communication device based on the moment at which the first data packet arrives at the communication device and the encoding start moment; and determining the PDB of the first data packet from the communication device to the terminal device based on the transmission delay and an end-to-end (E2E) PDB, wherein the E2E PDB is a PDB of the first data packet from the server to the terminal device.

18. The non-transitory computer readable medium according to claim 17, wherein the transmission delay of the first data packet from the server to the communication device is a difference between the moment at which the first data packet arrives at the communication device and the encoding start moment; and the PDB of the first data packet from the communication device to the terminal device is a difference between the E2E PDB and the transmission delay.

19. The non-transitory computer readable medium according to claim 15, wherein the instructions further comprise instructions for:

receiving a second data packet, wherein the second data packet is any data packet other than the first data packet in the at least two data packets, and a PDB of the second data packet from the communication device to the terminal device is equal to the PDB of the first data packet from the communication device to the terminal device.

20. The non-transitory computer readable medium according to claim 19, wherein a packet header of the first data packet and a packet header of the second data packet carry a same frame identifier, and the frame identifier indicates the first data frame.

* * * * *